(12) United States Patent
Hahn et al.

(10) Patent No.: US 10,159,024 B2
(45) Date of Patent: Dec. 18, 2018

(54) METHOD AND APPARATUS FOR PERFORMING HANDOVER IN WIRELESS COMMUNICATION SYSTEM

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/123,536

(22) PCT Filed: Feb. 17, 2015

(86) PCT No.: PCT/KR2015/001619
§ 371 (c)(1),
(2) Date: Sep. 2, 2016

(87) PCT Pub. No.: WO2015/133753
PCT Pub. Date: Sep. 11, 2015

(65) Prior Publication Data
US 2017/0078935 A1 Mar. 16, 2017

Related U.S. Application Data

(60) Provisional application No. 61/948,552, filed on Mar. 6, 2014, provisional application No. 61/952,883, filed on Mar. 14, 2014.

(51) Int. Cl.
*H04W 36/00* (2009.01)
*H04W 76/27* (2018.01)
(Continued)

(52) U.S. Cl.
CPC ... *H04W 36/0094* (2013.01); *H04W 36/0016* (2013.01); *H04W 36/0055* (2013.01);
(Continued)

(58) Field of Classification Search
CPC ............. H04W 84/005; H04W 84/047; H04W 36/0077; H04W 36/0094; H04W 36/0016;
(Continued)

(56) References Cited

U.S. PATENT DOCUMENTS

2001/0005677 A1* 6/2001 Dempo ............. H04W 36/0055
455/436
2004/0038681 A1 2/2004 Chun
(Continued)

FOREIGN PATENT DOCUMENTS

KR 10-2013-0126440 A 11/2013
WO WO 2013/070245 A1 5/2013
(Continued)

OTHER PUBLICATIONS

Aldhaibani et al., "Coverage Extension and Balancing the Transmitted Power of the Moving Relay Node at LTE—A Cellular Network," Hindawi, The Scientific World Journal, vol. 2014, Article ID 815720, Jan. 29, 2014, pp. 1-10 (11 pages).
(Continued)

*Primary Examiner* — Dung B Huynh
(74) *Attorney, Agent, or Firm* — Birch, Stewart, Kolasch & Birch, LLP

(57) ABSTRACT

A method for supporting handover of a moving entity by a serving base station comprises transmitting a measurement configuration message including measurement configuration regarding neighboring base stations, to the moving entity; receiving a handover accept message from a target base station, to which the moving entity will perform handover, among the neighboring base stations; and transmitting a
(Continued)

radio resource control (RRC) reconfiguration message indicating reconfiguration of RRC connection, to the moving entity, wherein a handover initiation scheme and a target base station selection scheme are determined according to whether the moving entity is a mobile terminal or a moving cell.

8 Claims, 16 Drawing Sheets

(51) Int. Cl.
*H04W 36/14* (2009.01)
*H04W 74/08* (2009.01)
*H04W 36/08* (2009.01)
*H04W 36/16* (2009.01)
*H04W 84/00* (2009.01)
*H04W 84/04* (2009.01)

(52) U.S. Cl.
CPC ....... *H04W 36/0077* (2013.01); *H04W 36/08* (2013.01); *H04W 36/14* (2013.01); *H04W 36/16* (2013.01); *H04W 74/0833* (2013.01); *H04W 76/27* (2018.02); *H04W 84/005* (2013.01); *H04W 84/047* (2013.01)

(58) Field of Classification Search
CPC . H04W 36/0055; H04W 36/08; H04W 36/14; H04W 74/0833; H04W 76/046; H04W 76/27

See application file for complete search history.

(56) References Cited

U.S. PATENT DOCUMENTS

| | | | |
|---|---|---|---|
| 2006/0224300 A1 | 10/2006 | Shioya et al. | |
| 2007/0147320 A1* | 6/2007 | Sattari | H04L 47/14 370/338 |
| 2009/0238122 A1* | 9/2009 | Vukovic | H04W 72/0493 370/329 |
| 2010/0027507 A1* | 2/2010 | Li | H04W 36/0055 370/331 |
| 2010/0061339 A1* | 3/2010 | Kim | H04W 36/0005 370/331 |
| 2010/0248619 A1* | 9/2010 | Senarath | H04B 7/2606 455/11.1 |
| 2011/0194407 A1* | 8/2011 | Ji | H04B 7/2606 370/226 |
| 2011/0261785 A1 | 10/2011 | Kwon et al. | |
| 2011/0268085 A1 | 11/2011 | Barany et al. | |
| 2012/0003962 A1* | 1/2012 | Jeon | H04W 36/0083 455/411 |
| 2012/0087303 A1 | 4/2012 | Kwon et al. | |
| 2012/0113838 A1 | 5/2012 | Lim et al. | |
| 2012/0129532 A1 | 5/2012 | Lim et al. | |
| 2012/0238268 A1 | 9/2012 | Radulescu et al. | |
| 2012/0315913 A1* | 12/2012 | Yang | H04W 48/16 455/438 |
| 2013/0083721 A1* | 4/2013 | Wu | H04W 36/0055 370/315 |
| 2013/0089022 A1* | 4/2013 | Lu | H04W 36/08 370/315 |
| 2013/0183971 A1* | 7/2013 | Tamaki | H04W 36/0061 455/436 |
| 2013/0195005 A1 | 8/2013 | Al-Shalash | |
| 2013/0244659 A1* | 9/2013 | Murasawa | H04W 36/34 455/436 |
| 2013/0329629 A1* | 12/2013 | Bao | H04W 36/0083 370/315 |
| 2014/0036776 A1* | 2/2014 | Al-Shalash | H04W 40/22 370/328 |
| 2014/0135008 A1* | 5/2014 | Yu | H04W 36/0077 455/436 |
| 2014/0211756 A1* | 7/2014 | Bontu | H04W 36/04 370/331 |
| 2014/0274060 A1* | 9/2014 | Fujishiro | H04W 8/14 455/436 |
| 2014/0370900 A1* | 12/2014 | Byun | H04W 36/0055 455/437 |
| 2015/0043422 A1* | 2/2015 | Fujishiro | H04W 16/26 370/315 |
| 2015/0111580 A1* | 4/2015 | Wu | H04W 36/0005 455/436 |
| 2015/0124708 A1* | 5/2015 | Blankenship | H04W 12/08 370/329 |
| 2015/0156708 A1 | 6/2015 | Tietz et al. | |
| 2015/0172907 A1 | 6/2015 | Jung et al. | |
| 2015/0181481 A1 | 6/2015 | Masini et al. | |
| 2015/0181493 A1 | 6/2015 | Park et al. | |
| 2015/0181502 A1 | 6/2015 | Hans et al. | |
| 2015/0195748 A1* | 7/2015 | Uchino | H04W 36/0011 370/331 |
| 2015/0195757 A1* | 7/2015 | Tietz | H04W 36/0061 455/438 |
| 2015/0195865 A1 | 7/2015 | Lee et al. | |
| 2015/0334585 A1* | 11/2015 | Chen | H04W 24/04 455/436 |
| 2016/0007243 A1 | 1/2016 | Park et al. | |
| 2016/0081021 A1 | 3/2016 | Abdel-Samad et al. | |
| 2016/0227459 A1* | 8/2016 | Fujishiro | H04W 16/32 |
| 2017/0127219 A1 | 5/2017 | Schmidt et al. | |

FOREIGN PATENT DOCUMENTS

| | | |
|---|---|---|
| WO | WO 2013/166640 A1 | 11/2013 |
| WO | WO 2014/010977 A1 | 1/2014 |
| WO | WO 2014/019740 A1 | 2/2014 |

OTHER PUBLICATIONS

Chen et al., "Network Mobility Protocol for Vehicular Ad Hoc Networks," International Journal of Communication Systems, Mar. 27, 2010, pp. 1-35.

Sui et al., "Moving Cells: A Promising Solution to Boost Performance for Vehicular Users," IEEE Communications Magazine, Jun. 2013, p. 62-68.

Catt (Rapporteur), "Report email#10: Mobile architecture options," R3-120486, 3GPP TSG RAN WG3#75bis, San Jose del Cabo, Mexico, Mar. 26-30, 2012, 10 pages, XP050668852.

\* cited by examiner

METHOD AND APPARATUS FOR PERFORMING HANDOVER IN WIRELESS COMMUNICATION SYSTEM

CROSS REFERENCE TO RELATED APPLICATIONS

This application is the National Phase of PCT International Application No. PCT/KR2015/001619, filed on Feb. 17, 2015, which claims priority under 35 U.S.C. 119(e) to U.S. Provisional Application Nos. 61/948,552, filed on Mar. 6, 2014 and 61/952,883, filed on Mar. 14, 2014, all of which are hereby expressly incorporated by reference into the present application.

TECHNICAL FIELD

The present invention relates to a wireless communication system, and more particularly, to a method and apparatus for performing a handover by a moving cell.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA).

Recently, a radio access network structure has been changed to a structure that various types of small cells, for example, pico cells or femto cells interact with a macro cell. As a cell structure is multi-layered, a data transmission rate and QoE may be improved. In the 3GPP, indoor/outdoor scenarios based on low power nodes to improve small cells have been discussed. This discussion is disclosed in the 3GPP TR 36.932. Also, dual connectivity for a macro cell and the small cells has been discussed. As described above, in the future wireless communication environment, as many small cells are used, it is expected that a user equipment and cells are located at a physically closer distance.

DISCLOSURE

Technical Problem

An object of the present invention is to provide a method for a moving cell to perform handover rapidly by efficiently acquiring information of a target cell, which is required for the moving cell to perform handover to the target cell.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one aspect of the present invention, a method for supporting handover of a moving entity by a serving base station comprises transmitting a measurement configuration message including measurement configuration regarding neighboring base stations, to the moving entity; receiving a handover accept message from a target base station, to which the moving entity will perform handover, among the neighboring base stations; and transmitting a radio resource control (RRC) reconfiguration message indicating reconfiguration of RRC connection, to the moving entity, wherein a handover initiation scheme and a target base station selection scheme are determined according to whether the moving entity is a mobile terminal or a moving cell.

According to another aspect of the present invention, a method for performing a handover by a moving cell comprises measuring neighboring base stations based on a measurement configuration message received from a serving base station; determining initiation of handover and a target base station in accordance with a result of the measurement of the neighboring base stations; and transmitting a random access preamble to the target base station in a state that radio resource control (RRC) connection to the serving base station is maintained, wherein, if a mobile terminal served by the moving cell performs handover, the moving cell releases RRC connection of the mobile terminal before the mobile terminal transmits the random access preamble.

According to other aspect of the present invention, a serving base station for supporting handover of a moving entity comprises a radio interface transmitting a measurement configuration message including measurement configuration regarding neighboring base stations, to the moving entity and transmitting a radio resource control (RRC) reconfiguration message indicating reconfiguration of RRC connection, to the moving entity; a backhaul interface receiving a handover accept message from a target base station, to which the moving entity will perform handover, among the neighboring base stations; and a processor controlling the radio interface and the backhaul interface, wherein a handover initiation scheme and a target base station selection scheme are determined according to whether the moving entity is a mobile terminal or a moving cell.

Advantageous Effects

According to one embodiment of the present invention, a moving cell may determine handover by itself and efficiently acquire information of a target cell, whereby the time required for handover may be reduced, and data interruption of the moving cell, which is caused by handover, may be minimized.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
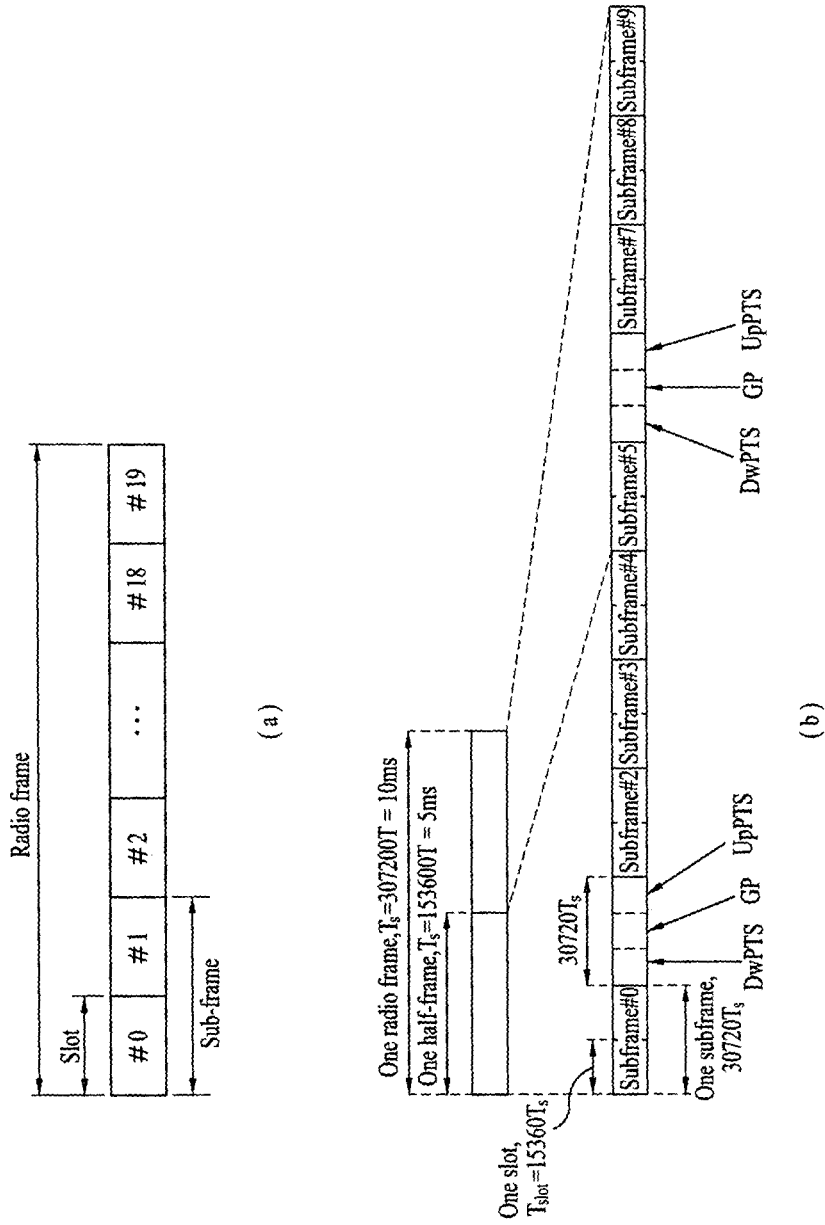
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame; the number of slots in a subframe, or the number of OFDM symbols in a slot may vary.

Figure 2:
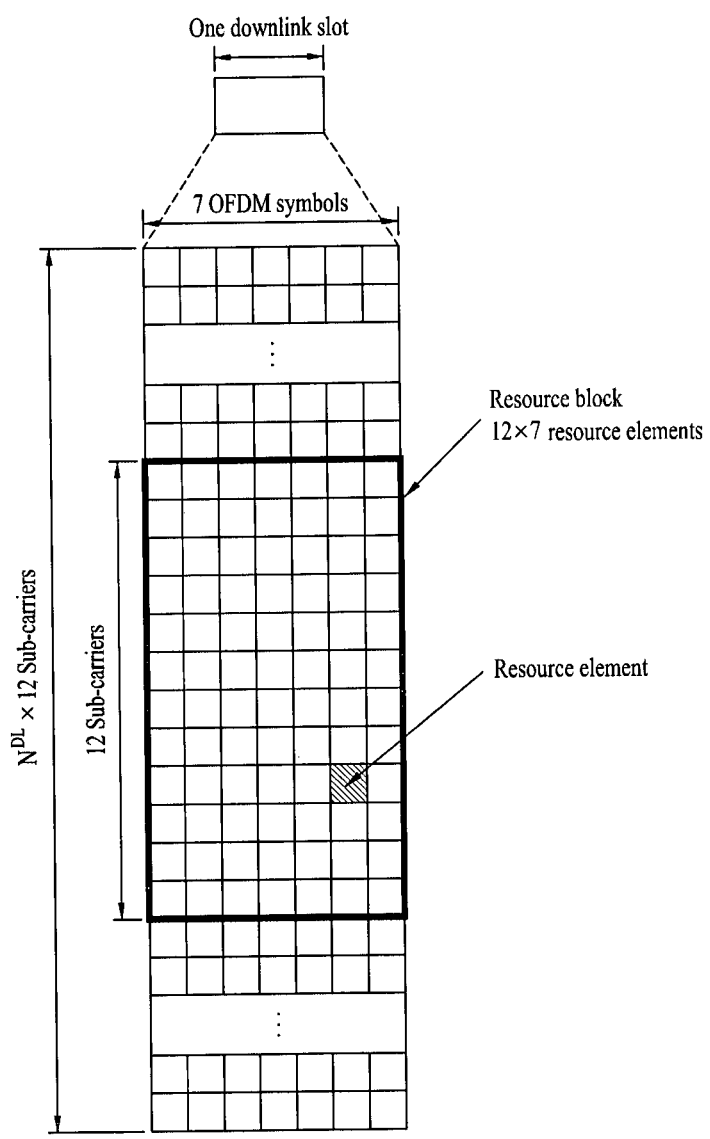
FIG. 2 is a diagram illustrating a resource grid at a downlink slot.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 3:
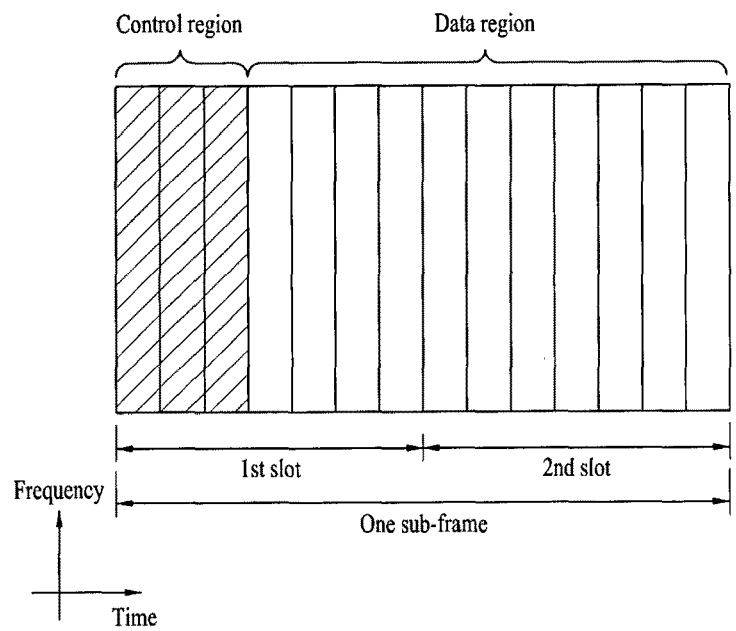
FIG. 3 is a diagram illustrating a structure of a downlink subframe.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
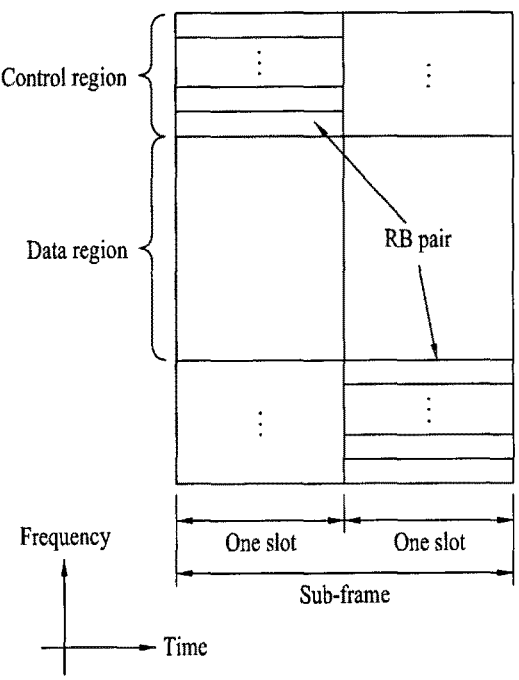
FIG. 4 is a diagram illustrating a structure of an uplink subframe.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

PSS (Primary Synchronous Signal)/SSS (Secondary Synchronous Signal)

Figure 5:
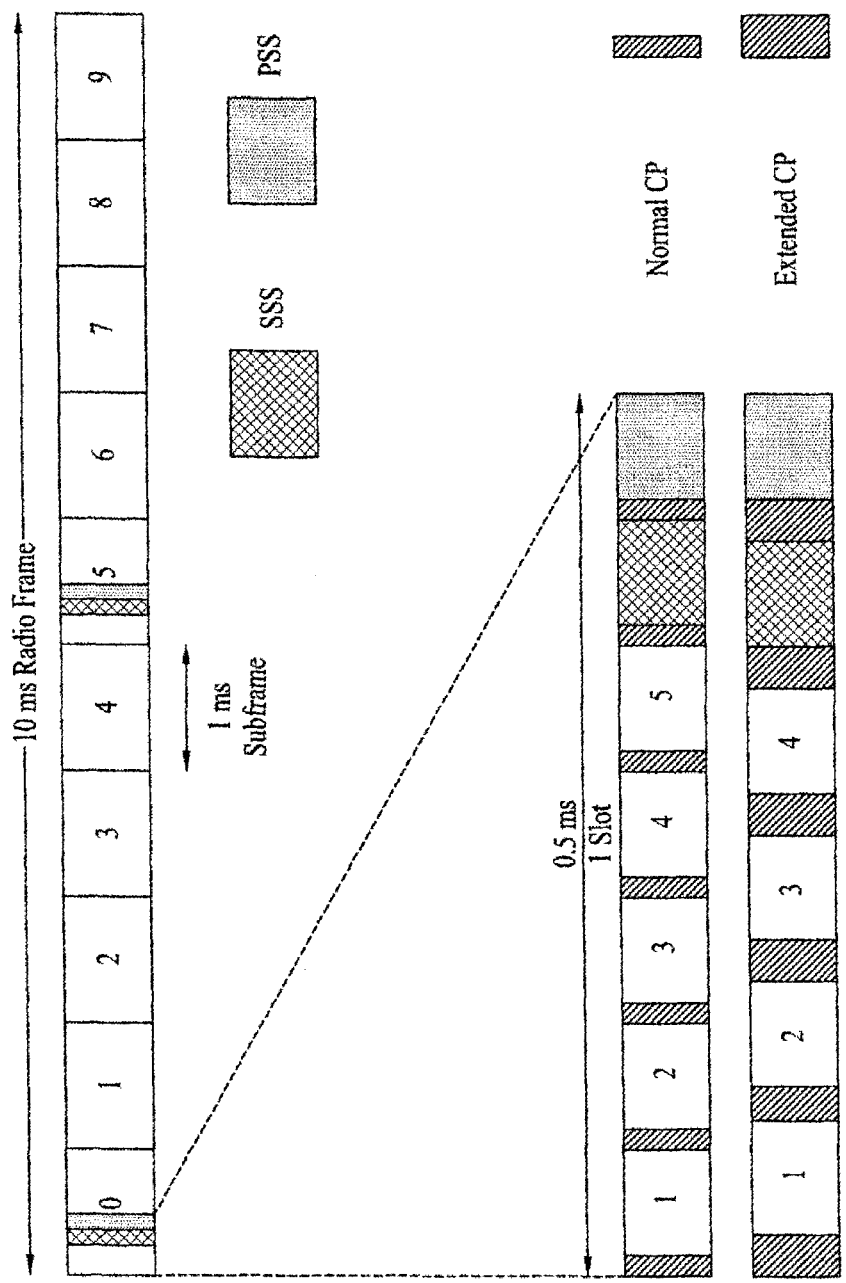
FIG. 5 is a diagram illustrating a primary synchronous signal (PSS)/secondary synchronous signal (SSS) in an FDD system.

FIG. 5 is a diagram illustrating a PSS and an SSS, which are synchronous signals used for cell search in an LTE/LTE-A system. Cell search will be described prior to description of the PSS and the SSS. When the user equipment is initially connected to a cell, cell search is performed if a user equipment performs handover from a cell, to which the user equipment is currently connected, to another cell, or is performed for cell reselection. Cell search may be performed by frequency and symbol synchronous acquisition of the cell, downlink frame synchronous acquisition of the cell, and determination of cell identifier (ID). Three cell IDs may constitute one cell group, and 168 cell groups may exist.

For cell search, a base station transmits the PSS and the SSS. The user equipment may acquire 5 ms timing of the cell by detecting the PSS and identify cell ID within the cell group. Also, the user equipment may identify radio frame timing and cell group by detecting the SSS.

Referring to FIG. 5, the PSS is transmitted from the subframes 0 and 5. In more detail, the PSS is transmitted from the last OFDM symbol of the first slot at the subframes 0 and 5. Also, the SSS is transmitted from the last second OFDM symbol of the first slot of the subframes 0 and 5. That is, the SSS is transmitted from the OFDM symbol just before the PSS is transmitted. This transmission timing corresponds to FDD (Frequency Division Duplex). In case of TDD (Time Division Duplex), the PSS is transmitted from the third symbol of the subframes 1 and 6, that is, DwPTS, and the SSS is transmitted from the last symbol of the subframes 0 and 5. That is, in the TDD, the SSS is transmitted prior to the PSS as much as three symbols.

The PSS is a Zadoff-Chu sequence of length 63, and in real transmission, 0 is padded at both ends of the sequence, whereby the sequence is transmitted onto 73 subcarriers (72 subcarriers except DC subcarrier, that is, 6 RBs) in the middle of a system frequency bandwidth. The SSS is a sequence of length 62, which is obtained as two sequences of length 31 are frequency-interleaved, and is transmitted onto 72 subcarriers in the middle of a full system bandwidth in the same manner as the PSS.

PBCH (Physical Broadcast Channel)

Figure 6:
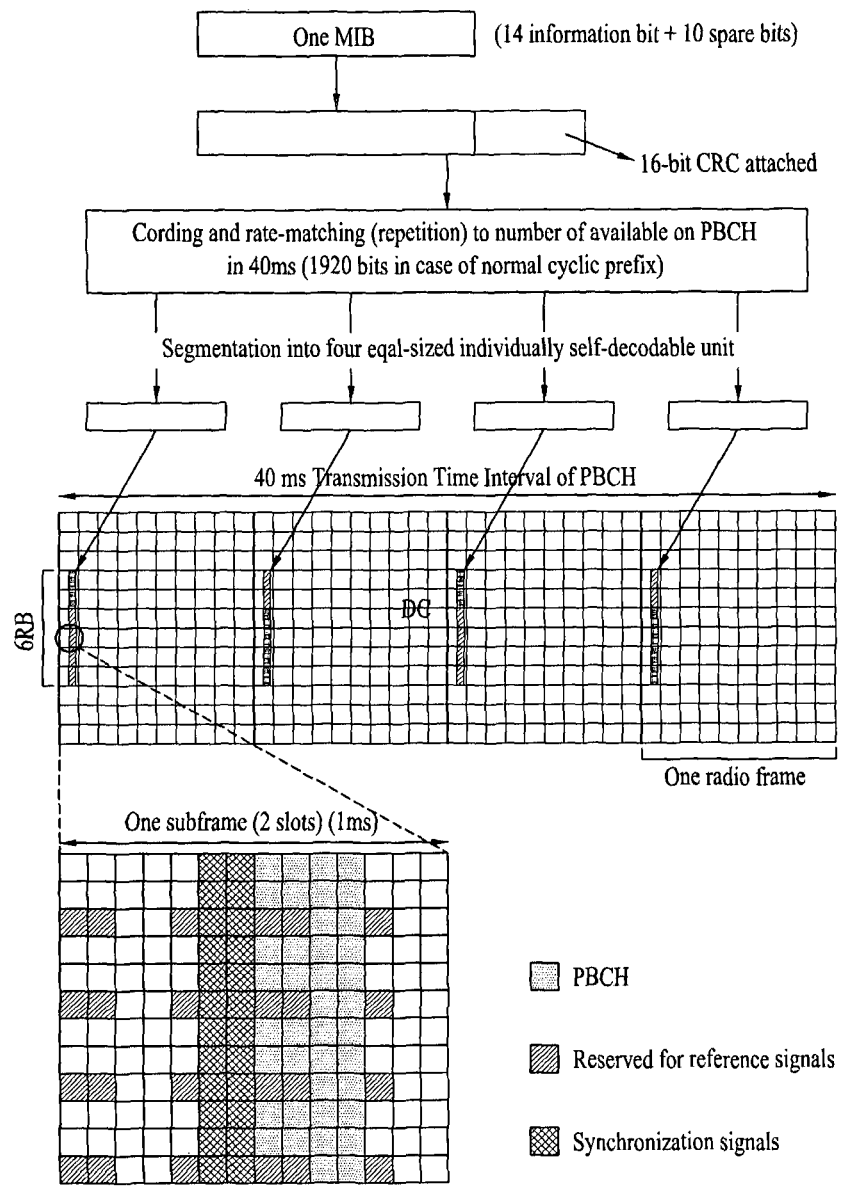
FIG. 6 is a diagram illustrating a physical broadcast channel (PBCH)

FIG. 6 is a diagram illustrating a physical broadcast channel (PBCH). The PBCH is the channel to which system information corresponding to a master information block (MIB) is transmitted, and is used to allow the user equipment to system information after acquiring downlink synchronization and cell ID through the aforementioned PSS/SSS. In this case, the MIB may include downlink cell bandwidth information, PHICH configuration information, subframe number (SFN), etc.

One MIB, as shown in FIG. 6, is transmitted through a first subframe of each of four continuous radio frames. In more detail, the PBCH is transmitted from first four OFDM symbols of the second slot of the subframe 0 at four continuous radio frames. Accordingly, the PBCH for transmitting one MIB is transmitted at a period of 40 ms. The PBCH is transmitted on 72 subcarriers in the middle of the full bandwidth on a frequency axis, which correspond to the smallest downlink bandwidth, 6 RBs. This is to allow the user equipment to decode BCH without problem even though the user equipment does not know the size of the full system bandwidth.

Handover of User Equipment (UE)

Figure 7:
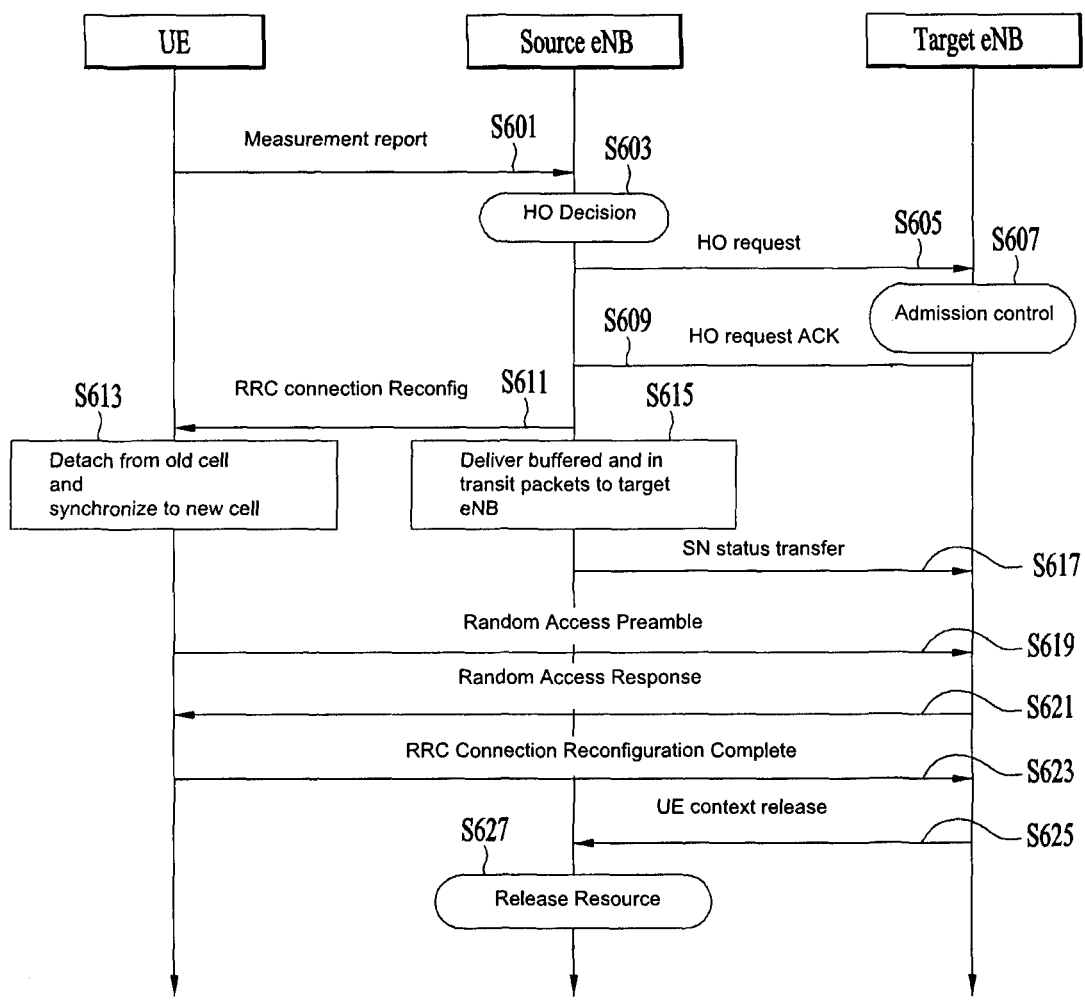
FIG. 7 is a diagram illustrating a handover procedure of a user equipment.

FIG. 7 is a diagram illustrating a handover procedure of a user equipment.

In FIG. 7, a network system may include a user equipment, a source base station (eNB), and a target base station (eNB). At this time, the source base station is a serving base station (or serving cell) that provides a scheduling service to the user equipment, and the target base station (or target cell) is the base station that will provide a scheduling service to the user equipment after handover is completed. Also, the source base station and the target base station may be fixed cells or moving cells. For example, the user equipment may perform handover from the fixed cell to the moving cell or move from the moving cell to the fixed cell. The user equipment may perform handover to a homogeneous cell. The fixed cell may be understood as a legacy cell, and the moving cell is a cell which is newly defined by the embodiments of the present invention and will be described in detail later.

Referring to FIG. 7, the user equipment transmits a measurement report message, which includes a measurement result of a neighboring cell, to the source base station (S601). In this case, the measurement report message may include reference signal received power (RSRP), received signal strength indicator (RSSI), and reference signal received quality (RSRQ). The RSRP is a measurement value that may be obtained by measuring a size of a downlink RS. The RSSI is a total received power value of the user equipment, and is a measurement value that includes interference from neighboring cells and noise power. The RSRQ is a value acquired based on N*RSRP/RSSI, wherein N is the number of RBs of a bandwidth during RSSI measurement.

Transmission of measurement report may be determined by event-based measurement report determination as follows. The event for measurement report determination may include, but not limited to, at least one of i) the event that a measurement value of the serving cell becomes greater than an absolute threshold value, ii) the event that the measurement value of the serving cell becomes smaller than the absolute threshold value, iii) the event that a measurement value of a neighboring cell becomes greater than the measurement value of the serving cell as much as an offset value, iv) the event that the measurement value of the neighboring cell becomes greater than the absolute threshold value, and v) the event that the measurement value of the serving cell becomes smaller than the absolute threshold value and the measurement value of the neighboring cell becomes greater than another absolute threshold value. In this case, the measurement value may be the aforementioned RSRP, etc. In a carrier aggregation environment, the serving cell may mean a PCell or SCell depending on the event.

The source base station may determine whether the user equipment will perform handover and determine the target base station to which the user equipment will perform handover (S603).

The source base station may transmit a handover request message to the target base station to perform handover (S605). For example, the source base station provides radio resource control (RRC) context information of the user equipment to the target base station.

The target base station determines whether to grant handover of the user equipment, based on the RRC context information (S607).

If handover of the user equipment is granted, the target base station transmits a handover (HO) request acknowledge message to the source base station (S609).

The source base station that has received the HO request acknowledge message transmits an RRC connection reconfiguration message to the user equipment to command the user equipment to perform the HO procedure (S611). The RRC connection reconfiguration message may include radio resource configuration information, security configuration, cell ID (C-RNTI), which are commonly applied to the user equipments served by the target base station. For example, the RRC connection reconfiguration message may include at least one of a Measurement Configuration IE (information element), a Mobility Control IE, a Radio Resource Configuration IE (e.g., RBs of the target base station, MAC Configuration, Physical Channel Configuration, and SIB that includes system information of the target base station), and Security Configuration IE. Table 1 illustrates a part extracted from the Mobility Control IE.

TABLE 1

```
MobilityControlInfo ::=    SEQUENCE {
    targetPhysCellId            PhysCellId,
    carrierFreq                 CarrierFreqEUTRA                OPTIONAL,    -- Cond HO-toEUTRA2
    carrierBandwidth            CarrierBandwidthEUTRA           OPTIONAL,    -- Cond HO-toEUTRA
    additionalSpectrumEmission  AdditionalSpectrumEmission      OPTIONAL,    -- Cond HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
    rach-ConfigDedicated        RACH-ConfigDedicated            OPTIONAL,    -- Need OP
    ...,
    [[ carrierFreq-v9e0         CarrierFreqEUTRA-v9e0           OPTIONAL     -- Need ON
    ]],
    [[ drb-ContinueROHC-r11     ENUMERATED {true}               OPTIONAL     -- Cond HO
    ]]
}
```

Table 2 illustrates a part extracted from radioResourceConfigCommon IE within the Mobility Control IE.

Table 3 illustrates a RACH-ConfigDedicated IE within the Mobility Control IE.

TABLE 2

```
RadioResourceConfigCommonSIB ::=   SEQUENCE {
    rach-ConfigCommon               RACH-ConfigCommon,
    bcch-Config                     BCCH-Config,
    pcch-Config                     PCCH-Config,
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    ul-CyclicPrefixLength           UL-CyclicPrefixLength,
    ...,
    [[ uplinkPowerControlCommon-v1020   UplinkPowerControlCommon-v1020   OPTIONAL    -- Need OR
    ]]
}
RadioResourceConfigCommon ::=      SEQUENCE {
    rach-ConfigCommon               RACH-ConfigCommon               OPTIONAL,   -- Need ON
    prach-Config                    PRACH-Config,
    pdsch-ConfigCommon              PDSCH-ConfigCommon              OPTIONAL,   -- Need ON
    pusch-ConfigCommon              PUSCH-ConfigCommon,
    phich-Config                    PHICH-Config                    OPTIONAL,   -- Need ON
    pucch-ConfigCommon              PUCCH-ConfigCommon              OPTIONAL,   -- Need ON
    soundingRS-UL-ConfigCommon      SoundingRS-UL-ConfigCommon      OPTIONAL,   -- Need ON
    uplinkPowerControlCommon        UplinkPowerControlCommon        OPTIONAL,   -- Need ON
    antennaInfoCommon               AntennaInfoCommon               OPTIONAL,   -- Need ON
    p-Max                           P-Max                           OPTIONAL,   -- Need OP
    tdd-Config                      TDD-Config                      OPTIONAL,   -- Cond TDD
    ul-CyclicPrefixLength           UL-CyclicPrefixLength,
    ...,
    [[ uplinkPowerControlCommon-v1020   UplinkPowerControlCommon-v1020   OPTIONAL   -- Need ON
    ]],
    [[ tdd-Config-v1130             TDD-Config-v1130                OPTIONAL    -- Cond TDD3
    ]]
}
```

TABLE 3

| | |
|---|---|
| RACH-ConfigDedicated ::= | SEQUENCE { |
| ra-PreambleIndex | INTEGER (0..63), |
| ra-PRACH-MaskIndex | INTEGER (0..15) |
| } | |

The user equipment that has received the RRC connection reconfiguration message may be detached from the existing cell (that is, source base station), and may perform a synchronization with a new cell (that is, target base station) (S613).

Since the source base station knows a target base station to which the user equipment will perform handover, the source base station forwards a buffered packet, which will be transmitted to the user equipment, to the target base station (S615).

The source base station transmits a sequence number (SN) status transfer message to the target base station to forward buffered data or packet to the target base station (S617).

In the meantime, the user equipment that has received the RRC connection reconfiguration message initiates a non-contention based random access procedure to the target base station. For example, the user equipment transmits a random access preamble to the target base station (S619). The user equipment randomly selects one random access preamble from a set of random access preambles indicated through a handover command, and transmits the random access preamble by selecting a physical RACH (PRACH) resource that may transmit the random access preamble. The target base station transmits uplink resource allocation information and timing advance (TA) information for uplink synchronization to the user equipment through a medium access control (MAC) message or RRC message in response to the random access preamble (S621).

The user equipment transmits RRC connection reconfiguration complete message to the target base station based on the uplink resource allocation information and the TA information (S623).

If the target base station receives the RRC connection reconfiguration complete message from the user equipment, the target base station transmits UE context release message, which requests removal of information related to the user equipment, to the serving base station (S625).

The serving base station that has received the UE context release message releases the resource for the user equipment and completes the handover procedure (S627).

The aforementioned handover procedure of the user equipment is categorized into a handover preparation procedure, a handover execution procedure, and a handover completion procedure. The maximum time is required for the handover execution procedure. The handover execution time means the time from the time when the user equipment receives the RRC connection reconfiguration message from the source base station (S611) to the time when the base station receives a handover connection reconfiguration complete message from the user equipment (S623). When the user equipment processes the RRC connection reconfiguration message during the handover execution procedure, the user equipment interrupts connection with the source base station and interrupts data reception from the source base station. Before the user equipment performs synchronization with the target base station and configures connection, the source base station forwards downlink data of the user equipment to the target base station. Such data forwarding is performed more quickly than reconfiguration of radio resources. Accordingly, the data forwarded to the target base station are stored in a buffer of the target base station and are on standby to be transmitted to the user equipment until the UE is ready to receive data from the target base station.

As described above, the time required from the time when the user equipment that has received the RRC connection reconfiguration message is detached from the source base station to the time when the user equipment completes RRC connection reconfiguration through synchronization with the target base station will be defined as data interruption time. In the current mobile communication system, the data interruption time is about 10.5 ms, and detailed time of each process is illustrated in Table 4 as follows.

TABLE 4

| Description | Time [ms] |
|---|---|
| Radio Synchronization to the target cell | 1 |
| Average delay due to RACH scheduling period (1 ms periodicity) | 0.5 |
| RACH Preamble | 1 |
| Preamble detection and transmission of RA response (Time between the end RACH transmission and UE's reception of scheduling grant and timing adjustment) | 5 |
| Decoding of scheduling grant and timing alignment | 2 |
| Transmission of DL Data | 1 |
| Total delay | 10.5 |

Moving Cell

In a hierarchical cell structure of a macro cell and a small cell, a moving cell may be considered as one type of the small cell. For example, the moving cell may be a small base station provided in a device (for example, transportation means such as bus, train, or smart car) which is physically moving, whereas the macro cell may be a fixed cell in the same manner as before.

Since the fixed cell (or macro cell) or the moving cell form the hierarchical cell structure, the moving cell and the user equipment may be similar to each other in view of the macro cell. However, the moving cell should transmit and receive aggregated traffic of large capacity based on a plurality of user equipments unlike a normal user equipment. Accordingly, a radio backhaul link that supports aggregated traffic of large capacity between the moving cell and the fixed cell is formed.

In the meantime, since the moving cell serves the user equipments, in view of the user equipments, the moving cell is regarded as the serving cell not another user equipment. The moving cell provides the user equipments with group mobility through physical movement and handover, wherein the user equipments are served by the moving cell. In-band communication within the moving cell may support a full duplex mode.

As illustrated in Table 5, various types of moving cells may be considered. In this case, respective features according to the types of the moving cells should be considered.

TABLE 5

| Category | Backhaul Distance | Mobility | Moving Pattern | Access Link User Load |
| --- | --- | --- | --- | --- |
| Public Transportation | Long | Wide speed range | Fixed | Medium/High |
| Smart Car | Medium/Short | Wide speed range | Arbitrary | Low/Medium |
| Personal Cell | Various | Low speed range | Arbitrary | Low/Medium |

For example, a moving pattern of the moving cell is regularly moved in accordance with a predetermined path in case of public transportation, whereas irregular movement may occur in case of a smart car or a personal cell. In this way, a moving distance, moving speed or traffic size may be varied depending on the type of the moving cell.

Handover of the user equipment is performed in such a manner that the source base station receives measurement reports of neighboring base stations from the user equipment and the source base station commands the user equipment to perform handover through negotiation with the target base station. Accordingly, handover of the user equipment is network initiated.

However, it is difficult to apply such a handover procedure of the user equipment to handover of the moving cell as it is. This is because that high reliability of communication service and less data interruption time are more required for the moving cell than handover of an individual user equipment as the moving cell serves a plurality of user equipments. Since the user equipment that has accessed the moving cell recognizes the moving cell as its serving cell, the moving cell should be transparent and robust to a change of a radio channel environment based on its movement in providing services to the user equipments. As illustrated in Table 4, delay of 10.5 ms occurs in handover of the user equipment, and it is preferable that the handover procedure of the moving cell is completed more quickly than 10.5 ms. The moving cell should complete handover by quickly sensing the fixed cell, whereby an effect due to handover, such as data interruption, may reach the user equipment served by the moving cell within the minimum range.

Handover of Moving Cell

According to one embodiment of the present invention, the moving cell determines and triggers handover to minimize its handover delay. For example, the moving cell directly accesses the target base station without measurement report to the source base station. The moving cell directly determines the target base station based on the measurement result and initiates handover, whereby the data interruption time may be reduced.

Figure 8:
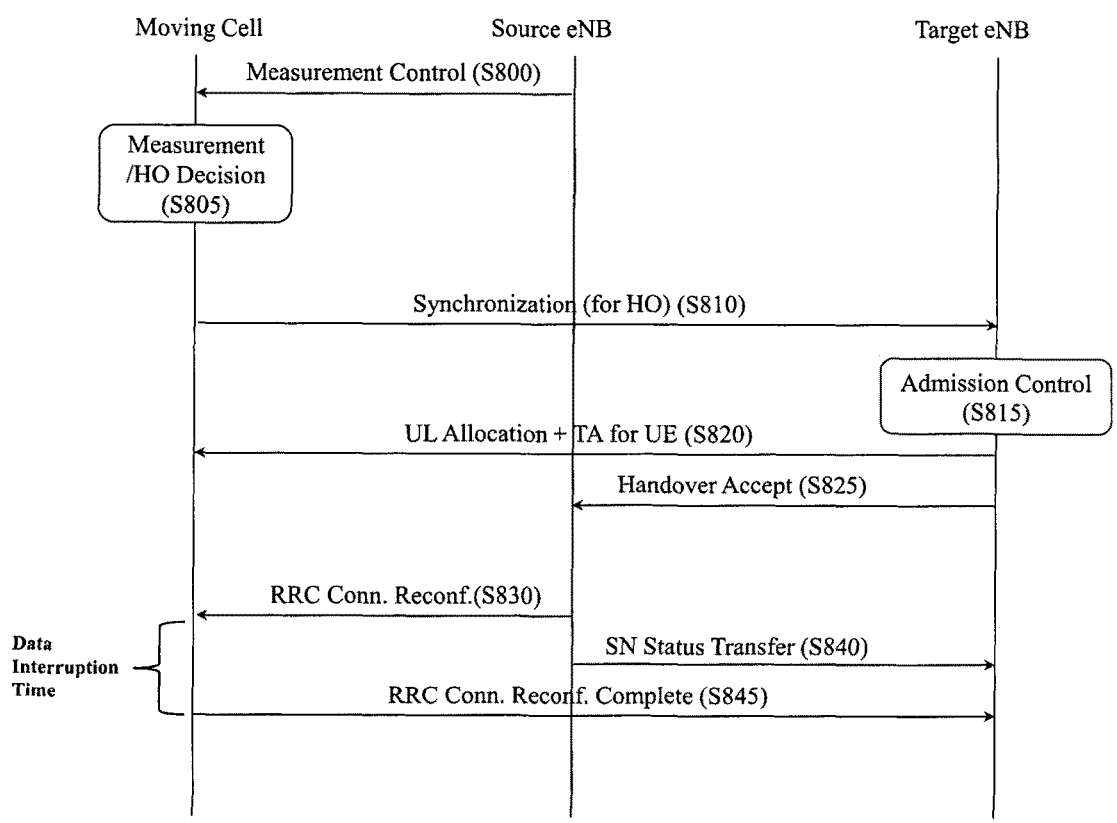
FIG. 8 is a diagram illustrating a handover procedure of a moving cell according to one embodiment of the present invention.

FIG. 8 is a diagram illustrating a handover procedure of a moving cell according to one embodiment of the present invention.

Referring to FIG. 8, the source base station transmits a measurement control message to the moving cell (S800). The measurement control message may be transmitted to the moving cell through RRC signaling. The measurement control message includes information required to perform measurement of a serving cell and neighboring cells. For example, time/frequency/period of which measurement is performed by the moving cell, information (e.g., cell ID) on the serving cell or the neighboring cells, which are measurement targets, a black list listing cells of which measurement is prohibited, frequency band (intra-frequency, inter-frequency) which is a measurement target, and information on a measurement gap for inter-frequency measurement may be transmitted through the measurement control message.

In the meantime, the measurement control message may include information on an event for triggering handover. If multiple carriers are configured for the moving cell, the event for triggering handover may be configured for each carrier. Meanwhile, the aforementioned events for measurement report of the user equipment may be reused as events for triggering handover of the moving cell. Unlike this, an event for triggering handover of the moving cell may newly be defined.

Meanwhile, the moving cell should perform a random access procedure with the target base station to access the target base station. If the moving cell performs the random access procedure based on contention such as initial access instead of handover, a random access preamble and/or RA-RNTI of the moving cell may collide with a random access preamble and/or RA-RANTI of another user equipment or another moving cell during the random access procedure. For example, since RA-RNTI is an identifier determined as a time/frequency function for transmitting the random access preamble, if the random access preamble transmitted from the moving cell is the same as that transmitted from another moving cell or user equipment, RA-RNTI contention occurs and a contention resolution procedure is performed. Since the contention resolution procedure causes time delay in performing handover, it is preferable that a non-contention based random access is performed.

In order that the moving cell performs the non-contention based random access, the measurement control message may include the random access preamble which will be transmitted from the moving cell. For example, the measurement control message may include a random access preamble allocated from the target base station to the moving cell. Meanwhile, since the target base station is determined by the moving cell, the source base station cannot know a neighboring cell which will be the target base station, at the time when the source base station transmits the measurement control message. Accordingly, the source base station may include random access preambles of a plurality of neighboring cells in the measurement control message. In this case, the random access preambles and identifiers of the neighboring cells may be mapped into one another and then may be included in the measurement report message.

In the meantime, the random access preambles allocated from the neighboring cells may previously be stored in the source base station. For example, the random access preamble B previously allocated from the neighboring base station A may be stored in the source base station. If the source base station forwards the random access preamble B to the moving cell C through the measurement control message, the source base station may previously notify the neighboring base station A that the moving cell C transmits the random access preamble B. At this time, context information of the moving cell, which includes ID of the moving cell, may be forwarded to the neighboring cell.

According to another embodiment, the moving cell performs contention based random access, and the random access preamble may be divided into a random access preamble type for the moving cell and a random access preamble type for the user equipment to prevent the moving cell from performing contention with the user equipment. At this time, although the random access procedure of the moving cell may collide with the random access procedure of another moving cell, if the number of entities of the moving cell is small, the possibility of collision is lowered. If the moving cell performs the contention based random access, the random access preamble is not included in the measurement control message.

The moving cell that has received the measurement control message performs measurement, and determines whether to perform handover (S805). For example, the moving cell measures the serving cell and the neighboring cell based on the measurement control message, and determines whether to perform handover based on the measurement result. According to one embodiment, the moving cell may determine whether to perform handover and request the source base station of handover. However, according to another embodiment, if the moving cell determines to perform handover, the moving cell may also determine the target base station by itself. That is, the moving cell may determine the target base station among the neighboring cells based on the measurement result. The measurement result of the neighboring cells may be RSRP and/or RSRQ, which is acquired through RS transmitted from the neighboring cell.

In the meantime, as the moving cell physically moves, the measurement values of RSRP and RSRQ may dynamically be varied. Accordingly, instead of using RSRP/RSRQ measured at one time only to determine the target base station, the neighboring cell, which provides optimized RSRP/RSRQ in accordance with the moving direction of the moving cell, may be determined as the target base station. For example, even though RSRP/RSRQ of the first neighboring cell is greater than RSRP/RSRQ of the second neighboring cell at the first time, if RSRP/RSRQ of the first neighboring cell at the second time after the first time becomes smaller than RSRP/RSRQ of the second neighboring cell, it may be regarded that the moving cell moves to be far away from the first neighboring cell and to be close to the second neighboring cell. In this way, it is preferable that the moving cell determines the target cell by accumulating the measurement results of the neighboring cells, which are acquired at different times.

For example, if an increased slope of RSRP/RSRQ of the second neighboring cell exceeds a predetermined threshold value, the second neighboring cell may be determined as the target base station, and handover to the second base station may be triggered. At this time, although not limited to, the predetermined threshold value may previously be set in the moving cell, may be acquired from the measurement values, or may be forwarded from the source base station to the moving cell through the measurement control message. For example, the event for triggering handover may include, but not limited to, at least one of i) the event that a decreased slope of the measurement value of the serving cell is greater than an absolute threshold value, ii) the event that the measurement value of the serving cell becomes smaller than the absolute threshold value, iii) the event that the increased slope of the measurement value of the neighboring cell becomes greater than the decreased slope of the measurement value of the serving cell as much as offset value, iv) the event that the increased slope of the measurement value of the neighboring cell becomes greater than the absolute threshold value, and v) the event that the measurement value of the serving cell becomes smaller than the absolute threshold value and the increased slope of the measurement value of the neighboring cell becomes greater than another absolute threshold value. In this way, in selecting the target base station and determining whether to perform handover, variation per time of RSRP/RSRQ may be considered.

The moving cell acquires downlink synchronization for handover to the target base station, and transmits a handover request message, which includes a random access preamble (S810). At this time, the moving cell acquires downlink synchronization to the target base station without releasing connection with the source base station and transmits the random access preamble. Accordingly, for the user equipments that have accessed the moving cell, the moving cell may transmit and receive uplink and downlink data to and from the source base station. The handover request message may include information on context of the moving cell. In another embodiment, the source base station may transmit the information on context of the moving cell to the neighboring base stations, whereby the target base station may acquire the information on context of the moving cell.

The target base station performs grant control for handover of the moving cell based on the information on context of the moving cell (S815).

If handover of the moving cell is granted, the target base station transmits resource for UL transmission and TA information to the moving cell (S820). Also, the target base station transmits a handover accept message, which indicates handover grant of the moving cell, to the source base station (S825). The handover accept message may include E-RAB information which is accepted or not accepted by the target base station.

The source base station that has received the handover accept message transmits RRC connection reconfiguration message to the moving cell (S830). The moving cell performs a detachment procedure from the source base station if the RRC connection reconfiguration message is received. Accordingly, data interruption is started in accordance with reception of the RRC connection reconfiguration message.

In the meantime, C-RNTI or random access preamble, which is allocated from the neighboring base stations in addition to the target base station, may be stored in the moving cell in a state that C-RNTI or random access preamble is not used. The source base station may command the moving cell to delete the C-RNTI or random access preamble allocated from the neighboring base stations through the RRC connection reconfiguration message. The moving cell deletes the C-RNTI or random access preamble allocated from the neighboring base stations in accordance with the command of the RRC connection reconfiguration message.

Meanwhile, according to one embodiment, in addition to the target base station, the neighboring base stations may previously acquire and store context information of the moving cell or information on a handover history of the moving cell from the source base station. The source base station may command the neighboring base stations in addition to the target base station to delete the context information of the moving cell or the information on the handover history of the moving cell in accordance with reception of the handover accept message.

The source base station transmits a status transfer message to the target base station in accordance with reception of the handover accept message (S840). The moving cell completes RRC configuration with the target base station based on the RRC connection reconfiguration message and transmits a connection reconfiguration complete message to the target base station (S845).

Meanwhile, the handover accept message may be forwarded to the source base station immediately after grant control is performed by the target base station.

In the aforementioned handover method of the moving cell, since the moving cell tries connection with the target base station in a state that connection with the source base station is maintained, data interruption time is reduced. For example, the moving cell tries connection with the target base station while receiving data from the source base station. Since the moving cell is detached from the source base station after trying connection with the target base station, the time required for the moving cell to access the target base station by interrupting connection with the source base station is reduced. If the handover method of the user equipment is a "Break before Make" type procedure, the handover method of the moving cell may be regarded as a "Make before Break" procedure. Table 6 illustrates the time required for handover of the moving cell in accordance with one embodiment of the present invention.

TABLE 6

| Description | Time [ms] |
|---|---|
| ~~Radio Synchronisation to the target cell~~ | ~~1~~ |
| ~~Average delay due to RACH scheduling period (1ms periodicity)~~ | ~~0.5~~ |
| ~~RACH Preamble~~ | ~~1~~ |
| ~~Preamble detection and transmission of RA response (Time between the end RACH~~ | ~~5~~ |
| ~~Transmission and UE's reception of scheduling grant and timing adjustment~~ | |
| Decoding of scheduling grant and timing alignment | 2 |
| Transmission of DL Data | 1 |
| Total delay | 3 |

Figure 9:
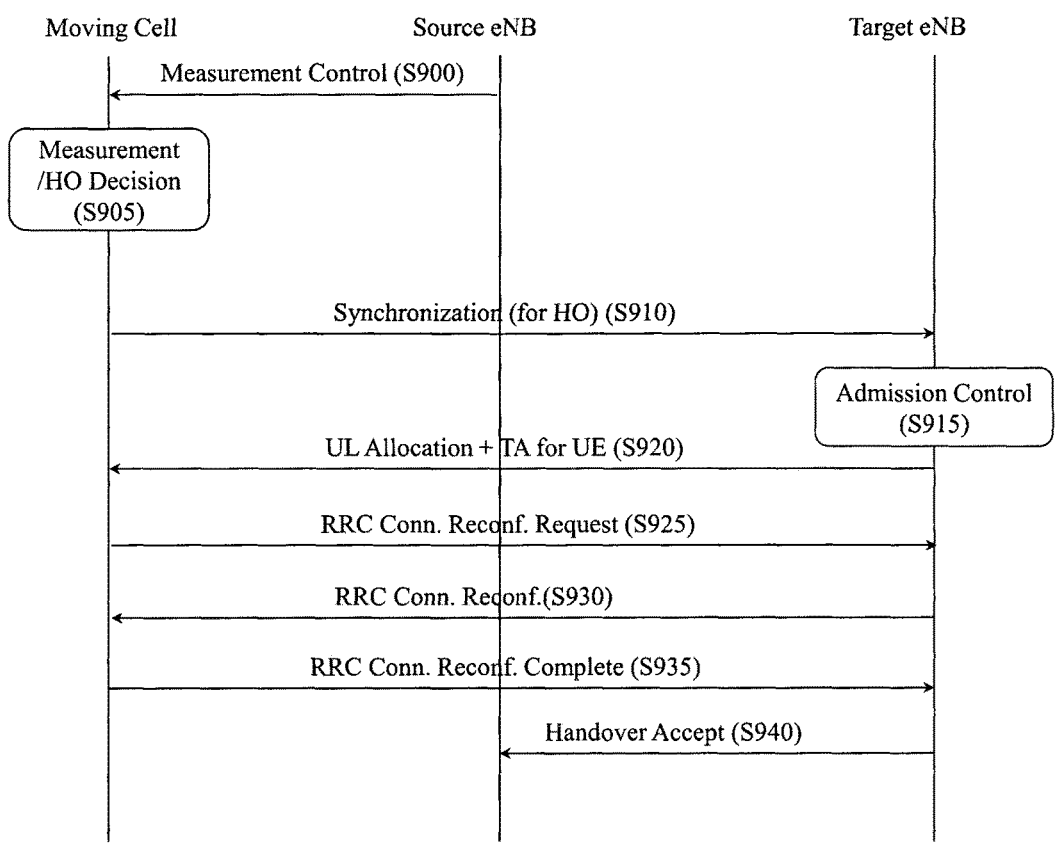
FIG. 9 is a diagram illustrating a handover procedure of a moving cell according to another embodiment of the present invention.

FIG. 9 is a diagram illustrating a handover procedure of a moving cell according to another embodiment of the present invention. Repeated description of FIG. 8 will be omitted, and a difference from the embodiment of FIG. 8 will be described mainly.

Referring to FIG. 9, the source base station transmits the measurement control message to the moving cell (S900). The moving cell that has received the measurement control message performs measurement, and determines whether to perform handover (S905). The moving cell performs downlink synchronization for handover to the target base station, and transmits a handover request message, which includes a random access preamble (S910). The target base station performs grant control for handover of the moving cell (S915). If handover of the moving cell is granted, the target base station transmits resource for UL transmission and TA information for uplink synchronization to the moving cell (S920). Similarly to FIG. 8, the moving cell performs downlink synchronization with the target base station in a state that connection with the source base station is not interrupted, and transmits the random access preamble.

The moving cell transmits RRC connection reconfiguration message to the target base station (S925). The RRC connection reconfiguration message may include Temporary Mobile Subscriber Identity (TMSI) of the moving cell, C-RNTI information of the moving cell, which is previously acquired from the source base station or the target base station, and a Cause value of RRC connection reconfiguration request. For handover of the moving cell, the Cause value of RRC connection reconfiguration request is set to a value corresponding to handover.

The target base station transmits RRC connection reconfiguration message to the moving cell in response to the RRC connection reconfiguration request (S930). That is, the target base station directly transmits information required for RRC reconfiguration with the target base station to the moving cell. In the embodiment of FIG. 8, the information required for RRC reconfiguration with the target base station is forwarded to the moving cell through the source base station, whereas the target base station directly transmits the RRC reconfiguration message in the embodiment of FIG. 9. The RRC connection reconfiguration message may include an identifier (e.g., C-RNTI) allocated from the neighboring base stations in addition to the target base station and stored in the moving cell and indication indicating deletion of the random access preamble. The moving cell deletes the identifier allocated from the neighboring base stations except the target base station and the random access preamble.

The moving cell transmits RRC reconfiguration complete message to the target cell if RRC reconfiguration is completed (S935).

The target base station transmits a handover accept message to the source base station to notify the source base station that handover of the moving cell has been accepted and completed (S904). The handover accept message may include E-RAB information which is accepted or not accepted by the target base station. The source base station that has received the handover accept message is detached from the moving cell. In order that the source base station is detached from the moving cell, RRC signaling still maintained with the moving cell may be used. For example, after receiving the handover accept message from the target base station, the source base station may transmit RRC signaling to the moving cell, whereby the moving cell and the source base station may be detached from each other. Alternatively, the source base station is detached from the moving just after receiving RRC connection setup message from the moving cell.

In this embodiment, since the moving cell configures RRC connection with the target base station and is detached from the source base station, the data interruption time does not occur. Meanwhile, the embodiment of FIG. 9 is favorably applied to a case where a moving path of the moving cell has a certain pattern or may be predicted.

Hereinafter, embodiments of a handover method considering a moving path of a moving cell will be described.

Handover Pre-Processing of Moving Cell Having Fixed Moving Path

If the moving cell moves along a bus line, a train track, etc., its next location may be predicted. In this way, the case where movement of the moving cell has a pattern, is previously notified, or is regular or consistent will be referred to as a fixed moving path.

The base stations located on the fixed moving path may share information on the moving path of the moving cell. A list of base stations to which the moving cell performs handover and information on the order may be shared by each base station.

In the handover method of the user equipment as shown in FIG. 7, when performing measurement, the user equipment does not acquire system information (e.g., MIB/SIB) of the target base station or RRC configuration. The user equipment acquires system information of the target base station and information on RRC configuration through the handover command message, that is, RRC connection reconfiguration message. Meanwhile, the system information of the target base station, which is acquired through the RRC connection reconfiguration message, is RadioResourceConfigCommonSIB IE included in SIB 2. Accordingly, in order that the user equipment acquires other system information of the target base station, the user equipment should receive SIBs (e.g., SIB 1 to SIB 14) transmitted through a downlink shared channel after synchronizing with the target base station.

According to one embodiment of the present invention, the moving cell may acquire the system information of the target base station or information on RRC configuration in advance before initiating handover. For example, the moving cell may acquire the system information of the target base station or information on RRC configuration before performing measurement of the neighboring cell. Accordingly, the moving cell does not need to acquire the system information of the target base station separately after performing handover to the target base station. As a result, the data interruption time of the user equipments that have accessed the moving cell may be minimized.

As described above, in order that the user equipment performs the non-contention based random access, a dedicated random access preamble of the user equipment, which is used in the target base station, and C-RNTI should be allocated to the moving cell. Meanwhile, the source base station may previously forward context information on the moving cell, information on a handover history, etc. to the target base station or neighboring base stations which are candidates of the target base station before handover of the moving cell is performed. In this way, a handover pre-processing procedure, which includes previous exchange of information, may be performed.

Figure 10:
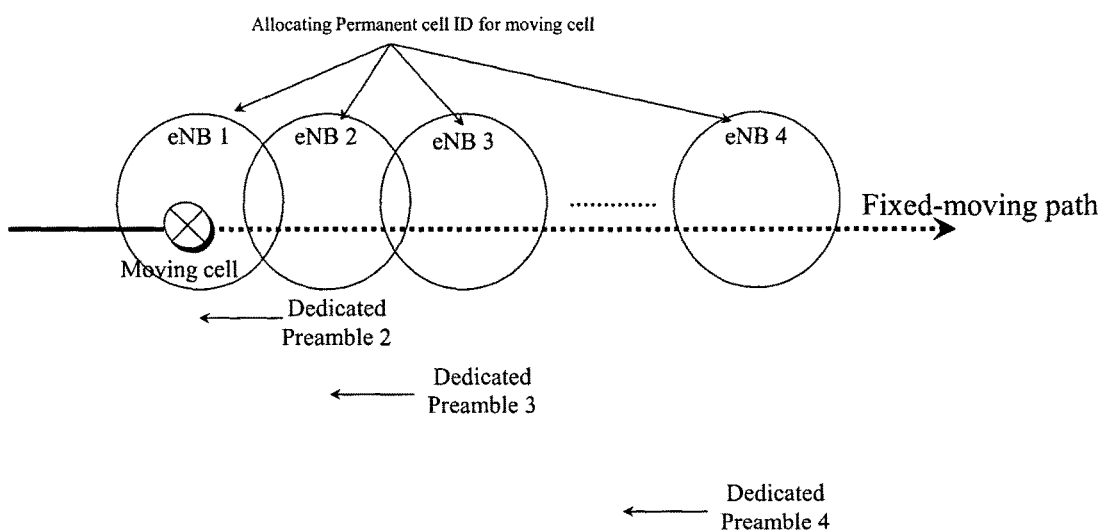
FIG. 10 is a diagram illustrating a moving track of a moving cell according to one embodiment of the present invention.

If the moving path of the moving cell is fixed, at least two or more of base stations located on the moving path may share an identifier (e.g., C-RNTI) of one moving cell. For example, the identifier of the moving cell, which is used prior to handover, may be reused even at the target base station after handover is performed. Referring to FIG. 10, the base stations located on the moving path allocate one permanent identifier for the moving cell. Generally, since C-RNTI is unique ID within the serving cell only, if the user equipment performs handover, the user equipment should be allocated with new C-RNTI which will be used within the target base station. ID of the moving cell according to the embodiment of the present invention is unique ID within the base stations on the moving path.

Figure 11:
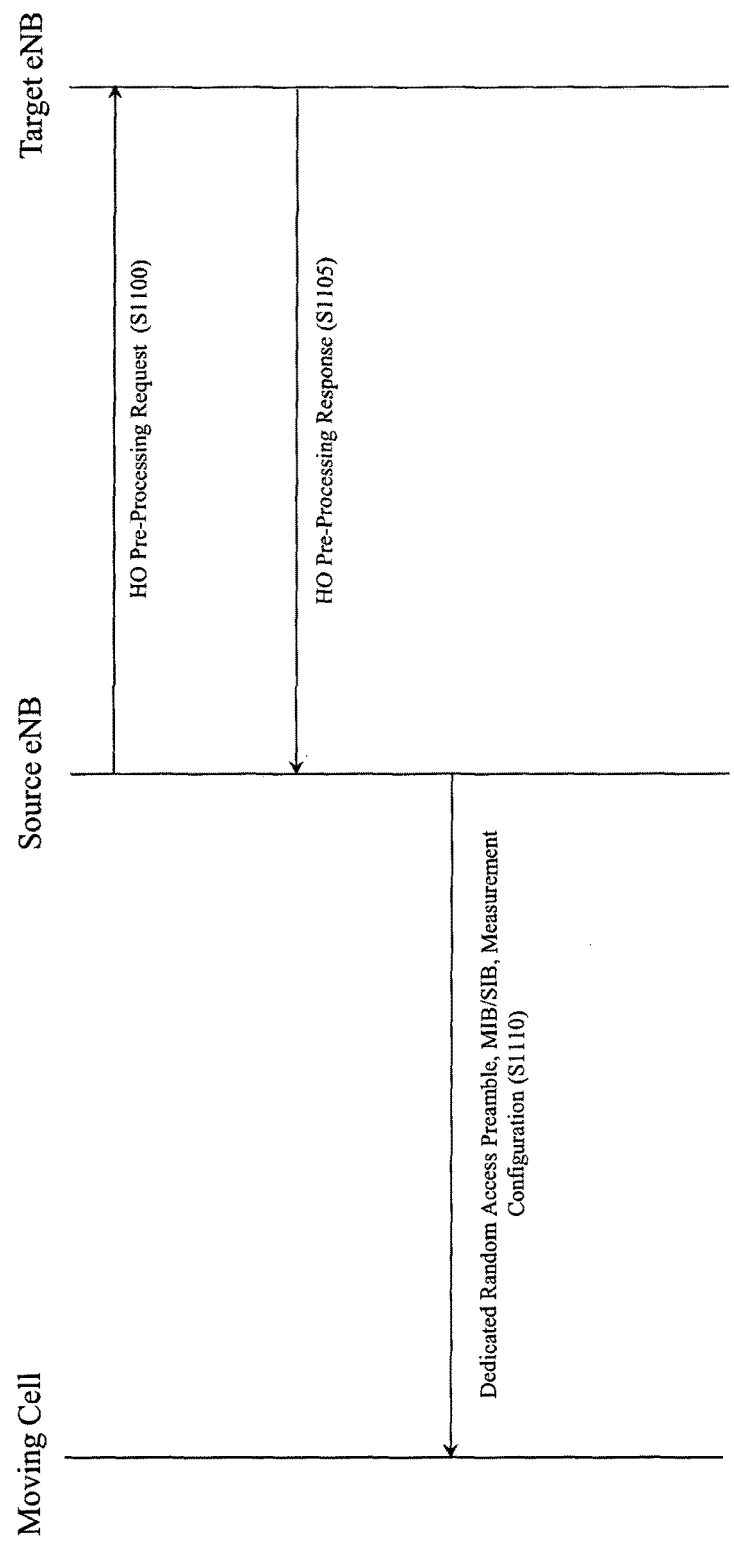
FIG. 11 is a diagram illustrating a handover pre-processing procedure of a moving cell according to one embodiment of the present invention.

Referring to FIGS. 10 and 11, it is assumed that the moving cell is currently located at the first base station and is scheduled to perform handover to the second base station in accordance with the fixed moving path. That is, it is assumed that the first base station is the serving base station and the second base station is the target base station.

The first base station may transmit a handover pre-processing request message, which includes at least one of ID of the moving cell, context information of the moving cell and a handover history of the moving cell, to the second base station (S1100). For example, if the moving cell configures RRC connection to the first base station through handover or initial access, the first base station may transmit the handover pre-processing request message to the second base station before the handover procedure of the moving cell is initiated. The information on the handover history may be used to identify a base station to which the moving cell will perform handover.

The second base station transmits a handover pre-processing response message, which includes the dedicated random access preamble of the moving cell, the system information of the target base station and RRC configuration information of the target base station, to the first base station in response to the handover pre-processing request message (S1105). The RRC configuration information of the target base station may include at least one of MobilityControlInfo IE, MeasConfig IE, and SecurityConfigHO IE.

The first base station transmits at least one of the random access preamble included in the handover pre-processing response message received from the second base station, the system information of the target base station and the RRC configuration information of the target base station to the moving cell (S1110).

In the meantime, permanent ID allocation of the moving cell may be performed uniquely for all the base stations existing in the moving path, and may be performed uniquely in a unit of tracking area (TA).

Meanwhile, if a plurality of cells exist in accordance with the moving path, measurement overhead of the moving cell may be increased. In order to reduce such measurement overhead, the source base station or the target base station may transmit a Measurement Configuration (Measurement Control) message, which includes measurement object (white cell) to be measured by the moving cell or information (black cell) not to be measured by the moving cell, to the moving cell through RRC signaling. At this time, the white cell may be, but not limited to, located on the moving path while the black cell may be, but not limited to, located at a long distance from the moving path.

Handover Pre-Processing of Moving Cell Having Non-Fixed Moving Path

If the moving path is not consistent, an exemplary embodiment for performing a handover pre-processing procedure will be described. The repeated description of the aforementioned description will be omitted.

Candidates of potential target base stations, to which the moving cell may perform handover, will be referred to as candidate base stations or candidate cells.

If the moving path is not fixed, it is difficult to allocate a unique permanent identifier from the base station on the moving path. That is, this is because that it is not possible to know a base station which will be located on the moving path. If all the base stations allocate unique ID to the moving cell, for the moving cell, the base stations, to which the moving cell does not perform handover, should allocate ID. However, since the number of IDs is restrictive, the method for allocating unique ID from all the base stations to the moving cell is not efficient in view of usage of the ID.

Accordingly, in the embodiment that the moving path is not fixed, it is assumed that unique ID (e.g., C-RNTI) is allocated within each serving base station (or cell) only. In the handover pre-processing procedure, the serving base station may request the candidate base stations of ID which will be used by the moving cell after handover is performed, thereby previously notifying the moving cell of the ID before handover of the moving is initiated.

A problem as to how the source base station determines the candidate base stations may occur. According to one embodiment of the present invention, E-SMLC (Evolved Serving Mobile Location Center) in the mobile communication system may be used. The E-SMLC is a network node that manages mobility and location measurement of the user equipment or the moving cell. The E-SMLC may identify what neighboring base stations exist based on the location of the moving cell. The E-SMLC determines candidate base stations, to which the moving cell may potentially perform handover, based on the information received from the source base station, for example, information on a handover history of the moving cell or ID of the moving cell. The source base station identifies the potential handover target base stations of the moving cell through the information received from the E-SMLC, and transmits the handover pre-processing request message to the target base stations.

In another embodiment, the moving cell may determine the candidate base stations. For example, if the moving cell perceives the potential handover base stations, that is, the candidate base stations through measurement, the moving cell transmits information on the candidate base stations to the source base station. The source base station transmits the handover pre-processing request message to the candidate base stations.

Figure 12:
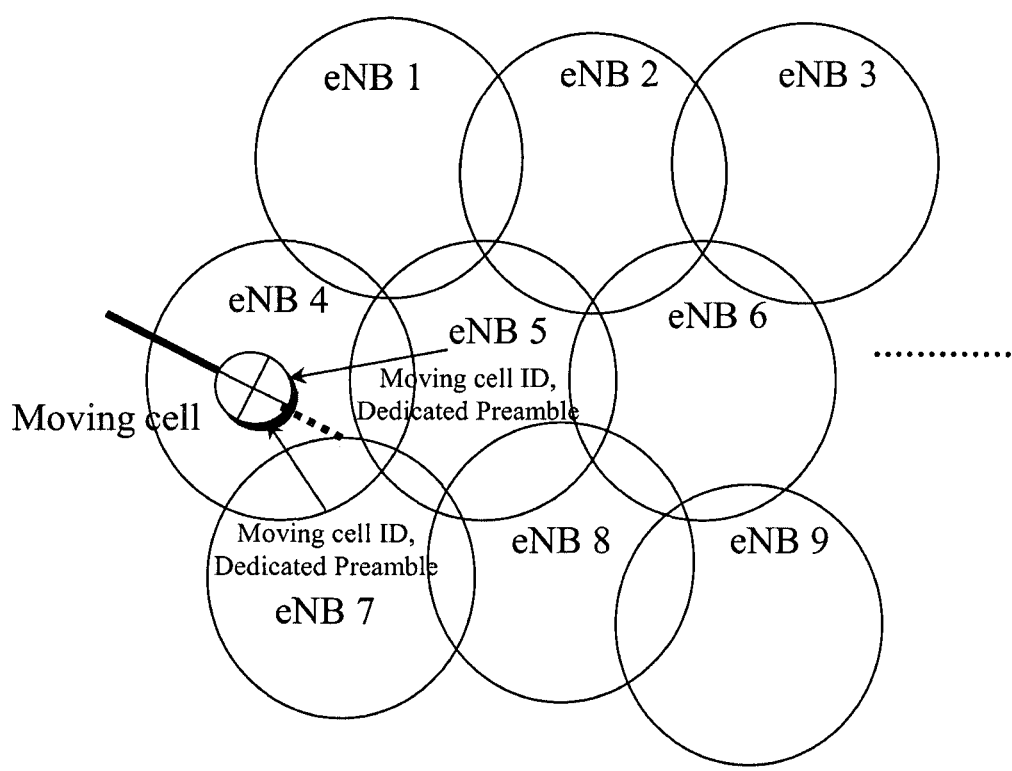
FIG. 12 is a diagram illustrating a moving track of a moving cell according to another embodiment of the present invention.
Figure 13:
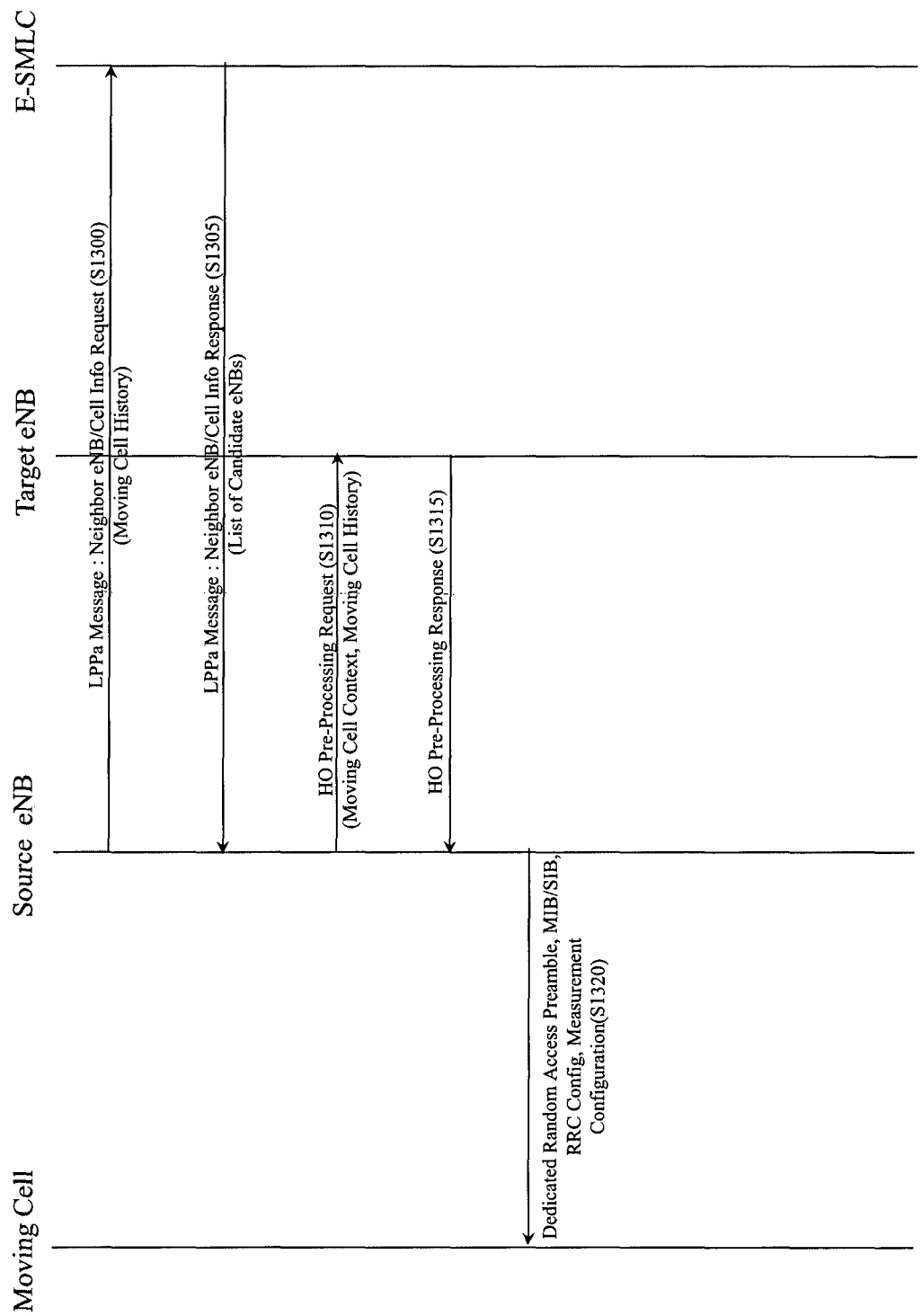
FIG. 13 is a diagram illustrating a handover pre-processing procedure of a moving cell according to another embodiment of the present invention.

Referring to FIGS. 12 and 13, it is assumed that the moving cell is currently located at eNB 4 and eNBs 1, 5 and 7 are the candidate base stations. The moving cell accesses the source base station through initial access or handover.

If the moving cell accesses the source base station, the source base station transmits a neighboring base station information request (Neighbor eNB/Cell Info Request) message requesting information on the candidate base stations to the E-SMLC (S1300). The neighboring base station information request message may include information on a handover history of the moving cell. The message transmitted and received between the source base station and the E-SMLC may be a format based on LTE positioning Protocol A (LPPa). The LPPa is defined by the 3GPP TS 36.455.

The E-SMLC determines candidate base stations determined that the moving cell may potentially perform handover, based on the information on the handover history of the moving cell. The E-SMLC may restrict the number of candidate base stations to increase a hit ratio of the target base station when determining the target base station. The E-SMLC transmits a neighboring base station information response message, which includes information on the determined candidate base stations, to the source base station (S1305).

The source base station transmits the handover pre-processing request message, which includes context information of the moving cell and information on the handover history of the moving cell, to the candidate base stations including the target base station (S1310).

The candidate base stations transmit the handover pre-processing response message, which includes at least one of C-RNTI for the moving cell, the random access preamble, system information of the candidate base stations, and RRC configuration information of the candidate base stations, to the source base station (S1315).

The source base station transmits the information received from the candidate base stations to the moving cell (S1320). Even in this case, the source base station or the candidate base stations may transmit information on cells which are measurement targets and information on cells which should not be measured, to the moving cell.

Figure 14:
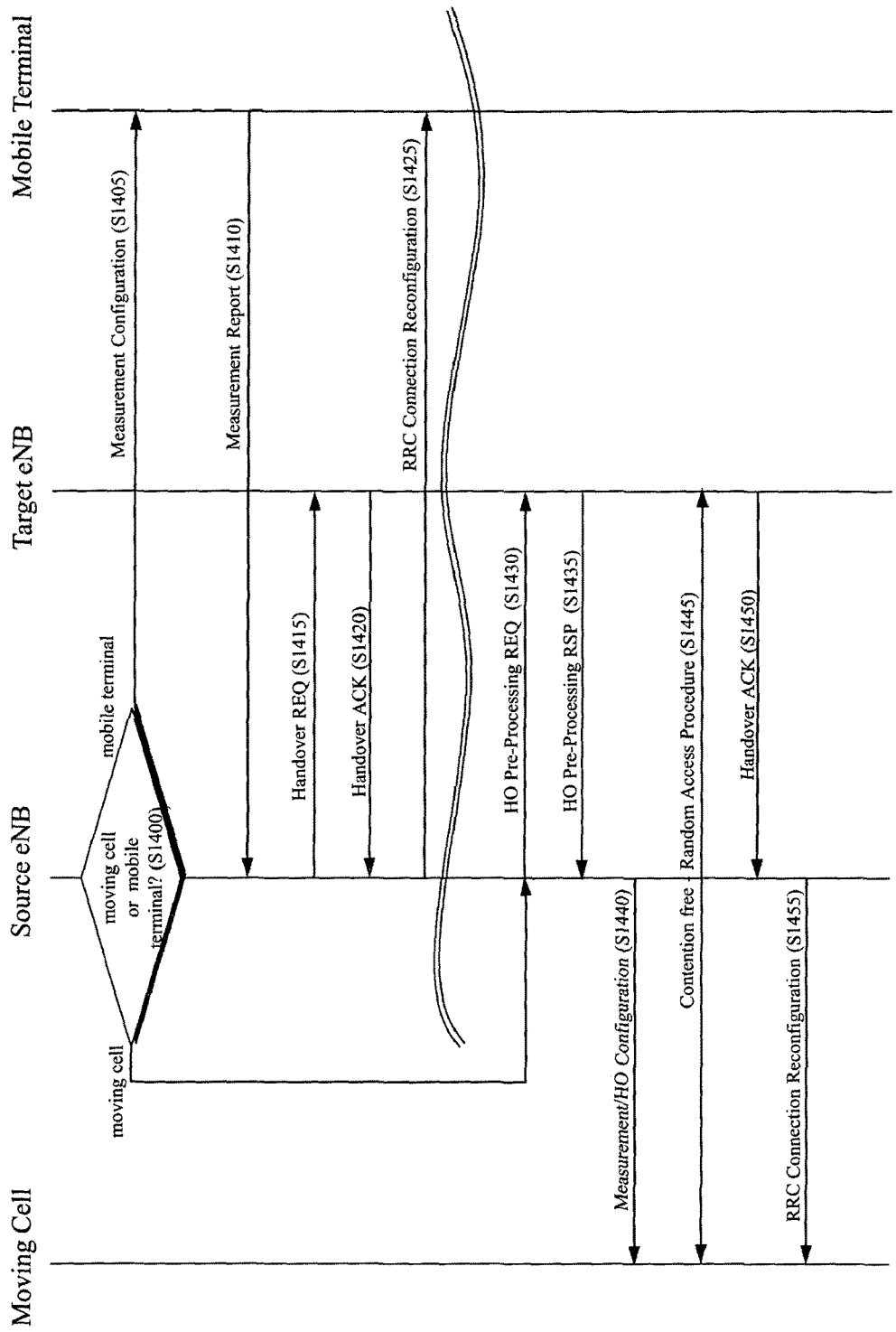
FIG. 14 is a diagram illustrating a handover procedure of a moving cell according to other embodiment of the present invention.

FIG. 14 is a diagram illustrating a handover procedure of a moving cell according to other embodiment of the present invention. Referring to FIG. 14, a moving cell, a mobile terminal, a source base station and a target base station are shown. It is assumed that the moving cell and the mobile terminal are served respectively by the source base station. The repeated description of the aforementioned embodiments will be omitted. Accordingly, this embodiment will be described with reference to the aforementioned descriptions.

A moving entity accesses the source base station. The moving entity is a network entity having mobility and includes the moving cell and the mobile terminal. The moving entity may initially access the source base station or access the source base station by performing handover from another base station.

If the moving entity accesses the source base station, the source base station determines whether the moving entity is the mobile terminal or the moving cell (S1400).

If the moving entity is the moving cell, the source base station transmits the handover pre-processing request message to the neighboring base stations including the target base station (S1430). The handover pre-processing request message may include information on a handover history of the moving cell.

The neighboring base stations transmit the handover pre-processing response message to the source base station (S1435). The handover pre-processing response message may include at least one of ID which will be used after the moving cell performs handover and information on random access preambles allocated from the neighboring base stations.

The source base station transmits a measurement configuration message, which includes measurement configuration information on the neighboring base stations and information required to determine whether the moving cell initiates handover, to the moving cell (S1440). The source base station may transmit the information acquired through the handover pre-processing response message to the moving cell.

The moving cell determines whether to initiate handover and the target base station based on the result of measurement of the neighboring base stations. If initiation of handover and the target base station are determined, the moving cell performs the non-contention based random access procedure with the target base station (S1445). That is, the moving cell transmits the allocated random access preamble to the target base station before handover from the target base station is initiated.

If the target base station accepts handover, the target base station transmits a handover accept message to the source base station (S1450).

The source base station transmits RRC connection reconfiguration message, which indicates reconfiguration of RRC connection, to the moving entity (S1455).

In the meantime, the source base station returns the IDs for the moving cell, which are allocated from the other neighboring base stations except the target base station, and/or the random access preamble to the other neighboring base stations in accordance with reception of the handover accept message. Also, the moving cell deletes the random access preamble allocated from the other neighboring base stations except the target base station.

The aforementioned handover of the moving cell may be performed transparently to the mobile terminals served by the moving cell.

If the moving entity is the mobile terminal, the source base station transmits a measurement configuration message, which includes measurement configuration on the neighboring base stations, to the moving entity (S1405). That is, the source base station does not transmit information for determining handover initiation to the mobile terminal. This is because that the serving base station determines handover initiation and the target base station if the moving entity is the mobile terminal. On the other hand, if the moving entity is the moving cell, the moving cell determines handover initiation and the target base station.

The source base station receives a measurement report from the mobile terminal (S1410). The source base station determines handover initiation of the mobile terminal and the target base station based on the measurement report. In this way, handover initiation and the selection scheme of the target base station are determined according to whether the moving entity is the mobile terminal or the moving cell.

The source base station transmits a handover request message to the target base station (S1415), and receives a handover accept message from the target base station (S1420).

The source base station transmits RRC connection reconfiguration message, which indicates reconfiguration of RRC connection, to the mobile terminal (S1425). The RRC connection reconfiguration message transmitted to the mobile terminal may include the random access preamble allocated from the target base station. That is, if the moving entity is the mobile terminal, the random access preamble is provided to the mobile terminal after handover is initiated through the RRC connection reconfiguration message. On the other hand, if the moving entity is the moving cell, the random access preamble allocated from the target base station is provided to the moving cell before handover is initiated.

In the meantime, handover of the mobile terminals in the moving cell may be performed in accordance with the aforementioned handover procedure of the mobile terminal. For example, if the mobile terminal served by the moving cell performs handover, the moving cell releases RRC connection of the mobile terminal before the mobile terminal transmits the random access preamble.

Figure 15:
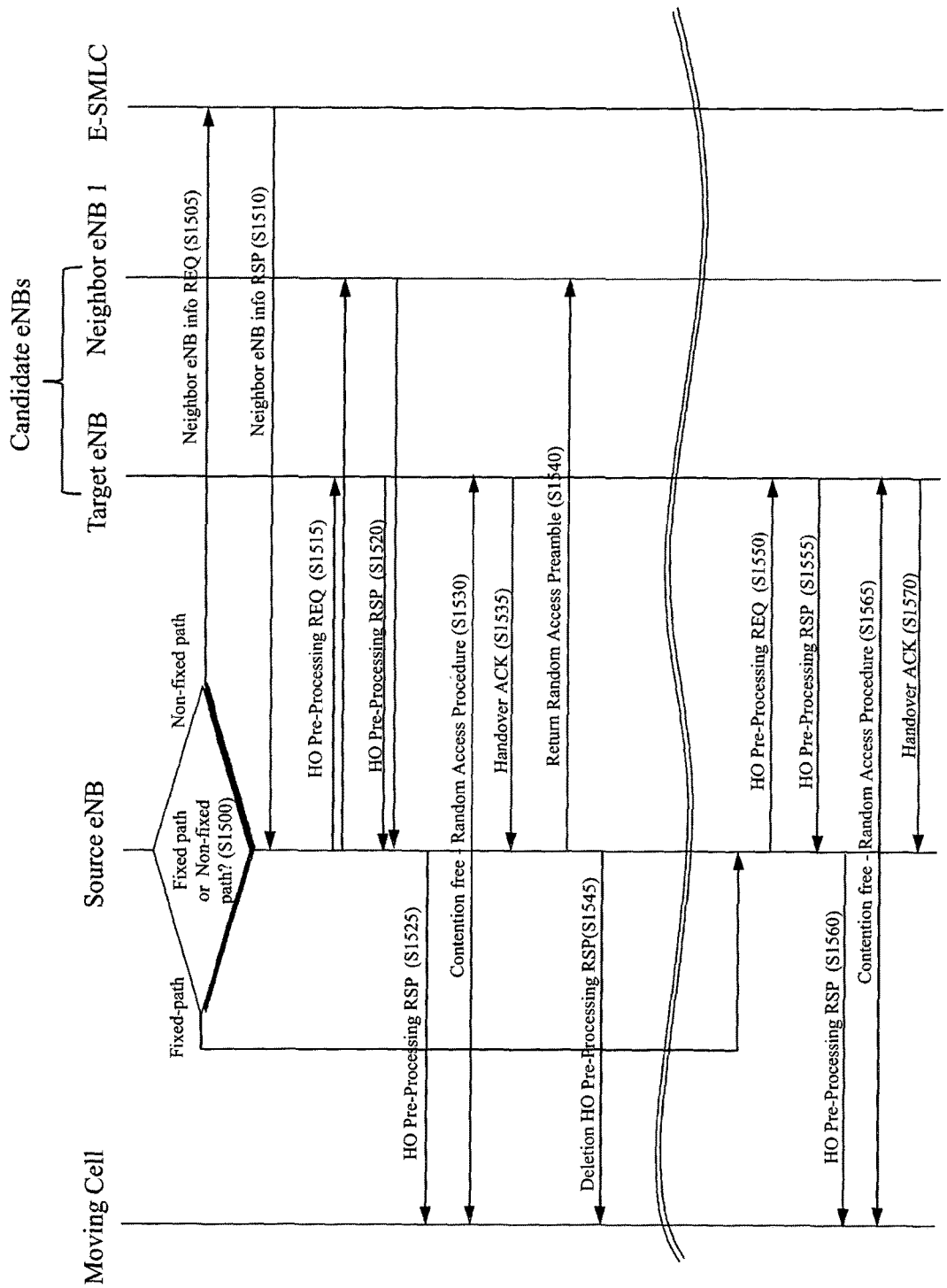
FIG. 15 is a diagram illustrating a handover pre-processing procedure of a moving cell according to other embodiment of the present invention.

FIG. 15 is a diagram illustrating a handover pre-processing procedure of a moving cell according to other embodiment of the present invention. The repeated description of the aforementioned description will be omitted.

First of all, the source base station determines whether the moving cell has a fixed moving path or a non-fixed moving path, based on the information on a handover history of the moving cell (S1500).

If the source base station determines that the moving cell has a non-fixed moving path, the source base station requests the E-SMLC of neighboring base station information (S1505). For example, the source base station transmits a message, which includes the information on a handover history of the moving cell, to the E-SMLC.

The source base station transmits a neighboring base station information response message, which includes a list of neighboring base stations (S1510). It is assumed that the list of neighboring base stations includes a target base station and a first neighboring base station.

The source base station transmits a handover pre-processing request message to the target base station and the first neighboring base station (S1515). The handover pre-processing request message may include information on a handover history of the moving cell and context information of the moving cell.

The source base station receives a handover pre-processing response message from each of the target base station and the first neighboring base station (S1520). The handover pre-processing response message may include a random access preamble, ID of the moving cell and information on RRC configuration.

The source base station forwards the handover pre-processing response message to the moving cell before handover is initiated (S1525).

The moving cell transmits the random access preamble to the target base station (S1530). Handover is initiated in accordance with transmission of the random access preamble.

The target base station transmits a handover response message, which indicates acceptance of handover, to the source base station (S1535).

The source base station returns the random access preamble, which is not used by the moving cell, to the first neighboring base station (S1540). Meanwhile, the source base station may return the ID allocated from the first neighboring base station to the moving cell together with the random access preamble. The first neighboring base station gets the random access preamble and the ID back from the moving cell, and may allocate the random access preamble and the ID to another moving cell or the mobile terminal. Also, the source base station may command the first neighboring base station to delete the information on a handover history of the moving cell and the context information of the moving cell.

The source base station may command the moving cell to delete the random access preamble of the first neighboring base station, the RRC configuration of the first neighboring base station, the system information of the first neighboring base station, and the ID allocated from the first neighboring base station (S1545).

Meanwhile, if the moving cell has a fixed moving path, the source base station may notify a base station to which the moving cell will perform handover. That is, the source base station may identify the target base station.

The source base station transmits the handover pre-processing request message to the target base station (S1550), receives the handover pre-processing response message from the target base station (S1560), and forwards the handover pre-processing response message to the moving cell (S1560). If handover of the moving cell is initiated (S1565), the source base station receives a handover response from the target base station (S1570). Meanwhile, the ID allocated from the source base station to the moving cell may be reused by the base stations located on the fixed moving path.

Figure 16:
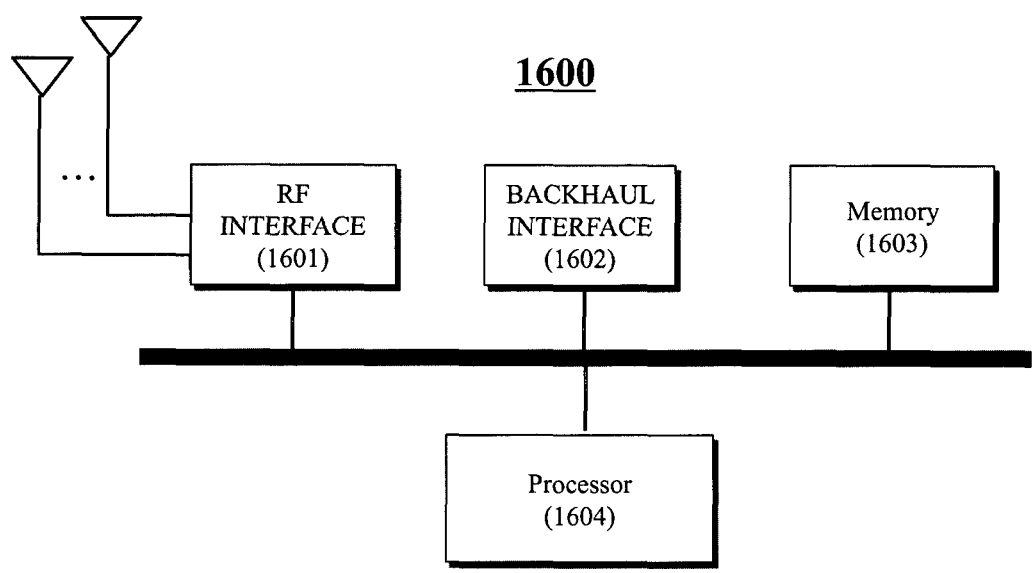
FIG. 16 is a diagram illustrating a cell according to one embodiment of the present invention.

FIG. 16 is a diagram illustrating a cell according to one embodiment of the present invention. The cell 1600 shown in FIG. 16 may be a moving cell or a fixed cell. If the cell 1600 is the fixed cell, the cell may be a serving base station that serves the moving cell or a neighboring base station located near the serving base station. The cell 1600 may perform the operation of the moving cell or the fixed cell in the aforementioned embodiments.

The cell 1600 includes a plurality of antennas for MU-MIMO, a radio interface 1601, a backhaul interface 1602, a memory 1603, and a processor 1604. The backhaul interface 1602 transmits and receives data to and from another cell or the base station through a backhaul link. If the backhaul interface 1602 forms a radio backhaul link, the backhaul interface 1602 and the radio interface 1601 may be implemented as one module. The radio interface 1601 transmits and receives signals to and from the mobile terminals through the plurality of antennas. The processor 1604 controls the backhaul interface 1602, the radio interface 1601, and the memory 1603.

First of all, it is assumed that the cell 1600 is a serving base station of the moving cell and the serving base station performs pre-processing for handover of the moving cell. At this time, the backhaul interface transmits a handover pre-processing request message, which includes information on a handover history of the moving cell to at least one neighboring base station located near the serving base station. The backhaul interface receives a pre-processing response message, which includes at least one of a random access preamble allocated from the neighboring base station, RRC configuration of the neighboring base station and system information of the neighboring base station, from the neighboring base station. The radio interface transmits the pre-processing response message to the moving cell before handover of the moving cell is initiated.

On the other hand, it is assumed that the cell 1600 is a neighboring base station that performs pre-processing for handover of the moving cell. At this time, the backhaul interface receives the handover pre-processing request message, which includes information on a handover history of the moving cell, from the serving base station. The backhaul interface transmits the pre-processing response message, which includes at least one of the random access preamble allocated from the neighboring base station, RRC configuration of the neighboring base station and system information of the neighboring base station, to the serving base station. The pre-processing response message transmitted from the neighboring base station is forwarded to the moving cell before handover of the moving cell is initiated.

In accordance with another embodiment, when the cell 1600 is the serving base station that supports handover of the moving entity, the radio interface transmits a measurement configuration message, which includes measurement configuration regarding neighboring base stations, to the moving entity. The radio interface transmits RRC connection reconfiguration message, which indicates reconfiguration of RRC connection, to the moving entity. The backhaul interface receives a handover accept message from the target base station, to which the moving entity will perform handover, among the neighboring base stations. At this time, handover initiation and a selection scheme of the target base station may be determined depending on whether the moving entity is a mobile terminal or a moving cell.

Figure 17:
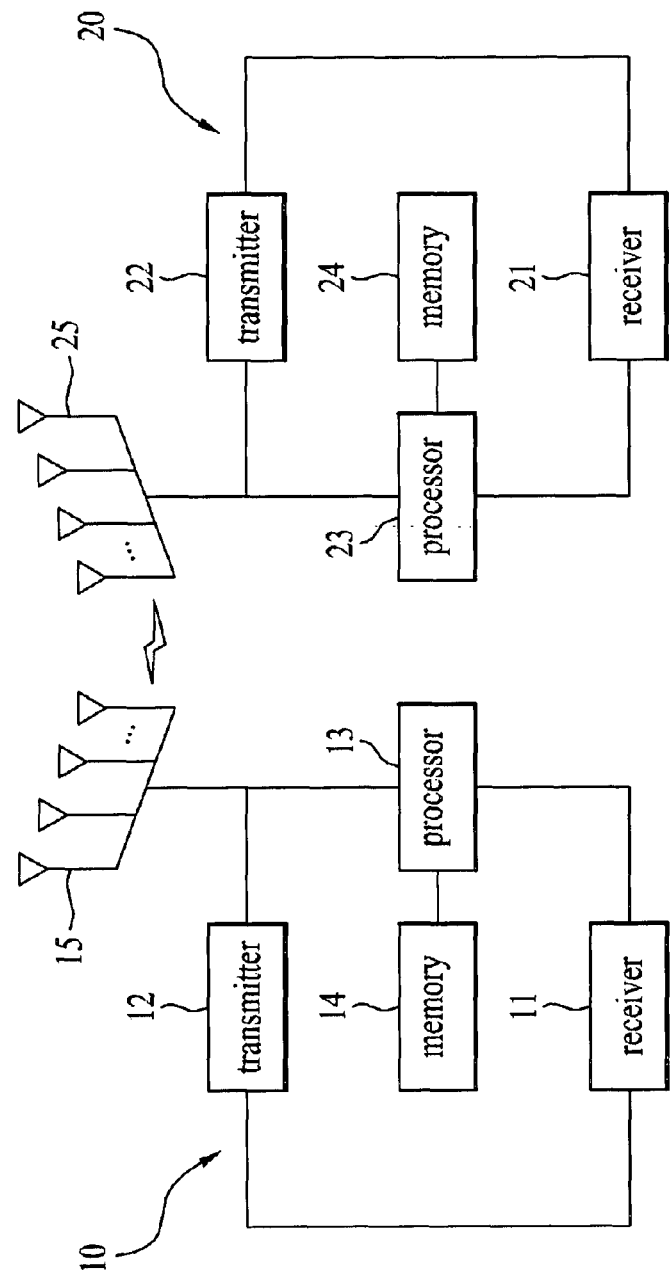
FIG. 17 is a diagram illustrating a structure of a user equipment and a base station according to one embodiment of the present invention.

FIG. 17 is a diagram illustrating a structure of a user equipment and a base station according to one embodiment of the present invention.

The base station 10 may include a transmitter 11, a receiver 12, a processor 13, a memory 14, and a plurality of antennas 15. The plurality of antennas 15 mean the base station that supports MIMO transmission and reception. The receiver 10 may receive various signals, data and information on an uplink from the user equipment. The transmitter 11 may transmit various signals, data and information on a downlink to the user equipment. The processor 13 may control the overall operation of the base station 10.

The processor 13 of the base station 10 may perform a function of operation-processing information received by the base station 10 and information to be transmitted to the outside. The memory 14 may store the operation-processed information for a predetermined time, and may be replaced with a buffer (not shown).

The user equipment 20 may include a transmitter 21, a receiver 22, a processor 23, a memory 24, and a plurality of antennas 25. The plurality of antennas 25 mean the user equipment that supports MIMO transmission and reception. The receiver 21 may receive various signals, data and information on the downlink from the base station. The transmitter 22 may transmit various signals, data and information on the uplink to the base station. The processor 23 may control the overall operation of the user equipment 20.

The processor 23 of the user equipment 20 may perform a function of operation-processing information received by the user equipment 20 and information to be transmitted to the outside. The memory 24 may store the operation-processed information for a predetermined time, and may be replaced with a buffer (not shown).

The aforementioned embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments according to the present invention may be applied to various wireless communication systems.

The invention claimed is:

1. A method for supporting handover of a moving entity by a serving base station, the method comprising:
   receiving, from neighboring base stations, identifiers and random access preambles to be allocated to a moving cell;
   transmitting a measurement configuration message including measurement configuration regarding the neighboring base stations, to the moving entity;

receiving a handover accept message from a target base station, to which the moving entity will perform handover, among the neighboring base stations; and transmitting a radio resource control (RRC) reconfiguration message indicating reconfiguration of RRC connection, to the moving entity, wherein a handover initiation scheme and a target base station selection scheme are determined according to whether the moving entity is a mobile terminal or the moving cell, and wherein when the moving entity is the moving cell, the serving base station returns the identifiers and random access preambles to the neighboring base stations except for the target base station in accordance with the reception of the handover accept message.

2. The method according to claim 1, wherein:

the serving base station determines initiation of the handover and the target base station if the moving entity is the mobile terminal, and the moving cell determines initiation of the handover and the target base station if the moving entity is the moving cell.

3. The method according to claim 1, wherein the measurement configuration message further includes information required for the moving cell to determine whether to initiate the handover if the moving entity is the moving cell.

4. The method according to claim 1, wherein:

if the moving entity is the moving cell, a random access preamble allocated from the target base station is provided to the moving cell before the handover is initiated, and if the moving entity is the mobile terminal, the random access preamble is provided to the mobile terminal through the RRC connection reconfiguration message after the handover is initiated.

5. The method according to claim 1, further comprising:

determining whether the moving entity is the mobile terminal or the moving cell.

6. The method according to claim 1, wherein the handover of the moving cell is performed transparently to mobile terminals served by the moving cell.

7. A serving base station for supporting handover of a moving entity, the serving base station comprising:

a radio interface configured to transmit a measurement configuration message including measurement configuration regarding neighboring base stations, to the moving entity and transmit a radio resource control (RRC) reconfiguration message indicating reconfiguration of RRC connection, to the moving entity;

a backhaul interface configured to receive, from the neighboring base stations, identifiers and random access preambles to be allocated to a moving cell and receive a handover accept message from a target base station, to which the moving entity will perform handover, among the neighboring base stations; and a processor configured to control the radio interface and the backhaul interface, wherein a handover initiation scheme and a target base station selection scheme are determined according to whether the moving entity is a mobile terminal or the moving cell, and wherein when the moving entity is the moving cell, the processor returns the identifiers and random access preambles to the neighboring base stations except for the target base station in accordance with the reception of the handover accept message.

8. The serving base station according to claim 7, wherein:

the serving base station determines initiation of the handover and the target base station if the moving entity is the mobile terminal, and the moving cell determines initiation of the handover and the target base station if the moving entity is the moving cell.

\* \* \* \* \*